(12) United States Patent
Grider et al.

(10) Patent No.: US 10,782,007 B2
(45) Date of Patent: *Sep. 22, 2020

(54) MODULAR SYSTEM

(71) Applicant: TTP Holdings, LLC, Dallas, TX (US)

(72) Inventors: Christopher Grider, Dallas, TX (US); Derek Smith, Dallas, TX (US)

(73) Assignee: TTP Holdings, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,386

(22) Filed: Oct. 17, 2018

(65) Prior Publication Data
US 2019/0063734 A1   Feb. 28, 2019

Related U.S. Application Data

(63) Continuation of application No. 15/989,559, filed on May 25, 2018, now Pat. No. 10,215,383, which is a
(Continued)

(51) Int. Cl.
*F21V 21/096* (2006.01)
*F21L 4/08* (2006.01)
*F21V 23/06* (2006.01)
*F21V 21/06* (2006.01)
*F21V 8/00* (2006.01)
(Continued)

(52) U.S. Cl.
CPC ............ *F21V 21/0965* (2013.01); *F21K 9/20* (2016.08); *F21L 4/08* (2013.01); *F21L 4/085* (2013.01); *F21V 3/00* (2013.01); *F21V 21/06* (2013.01); *F21V 23/005* (2013.01); *F21V 23/06* (2013.01); *G02B 6/0096* (2013.01); *B62J 1/00* (2013.01); *F21L 4/04* (2013.01); *F21L 2001/00* (2013.01); *F21S 9/02* (2013.01); *F21V 21/0885* (2013.01); *F21Y 2115/10* (2016.08); *H05K 999/99* (2013.01)

(58) Field of Classification Search
CPC ........ F21V 21/0965; F21V 3/00; F21V 21/06; F21V 23/005; F21V 23/06; F21V 21/0885; F21V 21/096; F21V 8/00; F21V 23/00; F21K 9/20; F21L 4/08; F21L 4/085; F21L 4/04; F21L 2001/00; G02B 6/0096; F21Y 2115/10; B62J 1/00; F21S 9/02; H05K 999/99
See application file for complete search history.

(56) References Cited

U.S. PATENT DOCUMENTS 3,601,595 A    8/1971  Kivela
4,282,562 A *  8/1981  Marino ............... F21V 21/0965
                                                          362/183
(Continued)

*Primary Examiner* — Bao Q Truong
(74) *Attorney, Agent, or Firm* — Kirby Drake

(57) ABSTRACT

A modular system may include a plurality of magnets that may be provided to self-align a casing with an accessory. Self-alignment of the casing and the accessory may provide a secure connection of the casing with the accessory. At least one detent and at least one locking arm may mate and lock the casing against the accessory in a mounted position. The at least one detent and the at least one locking arm may unlock in an insertion position. Self-alignment may occur when a first set of magnets attracts a second set of magnets in which opposite polarities attract and automatically initiate movement of the casing towards the accessory.

4 Claims, 23 Drawing Sheets

Related U.S. Application Data continuation of application No. 15/293,060, filed on Oct. 13, 2016, now Pat. No. 10,047,938, which is a continuation-in-part of application No. 15/211,904, filed on Jul. 15, 2016, now Pat. No. 9,568,171.

(51) Int. Cl.

| | | |
|---|---|---|
| *F21V 3/00* | (2015.01) | |
| *F21V 23/00* | (2015.01) | |
| *F21K 9/20* | (2016.01) | |
| *F21Y 115/10* | (2016.01) | |
| *F21L 4/04* | (2006.01) | |
| *B62J 1/00* | (2006.01) | |
| *F21S 9/02* | (2006.01) | |
| *F21V 21/088* | (2006.01) | |
| *F21V 1/00* | (2006.01) | |

(56) References Cited

U.S. PATENT DOCUMENTS

| | | |
|---|---|---|
| 4,428,033 A | 1/1984 | McBride |
| 5,034,847 A | 7/1991 | Brain |
| 7,905,626 B2 | 3/2011 | Shantha et al. |
| 8,425,082 B2 | 4/2013 | Wang |
| 8,888,311 B2 | 11/2014 | Parsons |
| 9,155,170 B2 | 10/2015 | Shah et al. |
| 9,228,704 B2 | 1/2016 | Andersen et al. |
| 9,312,634 B2 | 4/2016 | Fullerton et al. |
| 10,047,938 B2 * | 8/2018 | Grider .................. F21V 21/06 |
| 2011/0068741 A1 | 3/2011 | Liu |
| 2014/0104830 A1 | 4/2014 | Velazquez |
| 2014/0153265 A1 | 6/2014 | Rudisill et al. |
| 2015/0176782 A1 | 6/2015 | McLennan et al. |
| 2015/0280489 A1 | 10/2015 | Curlett |

* cited by examiner

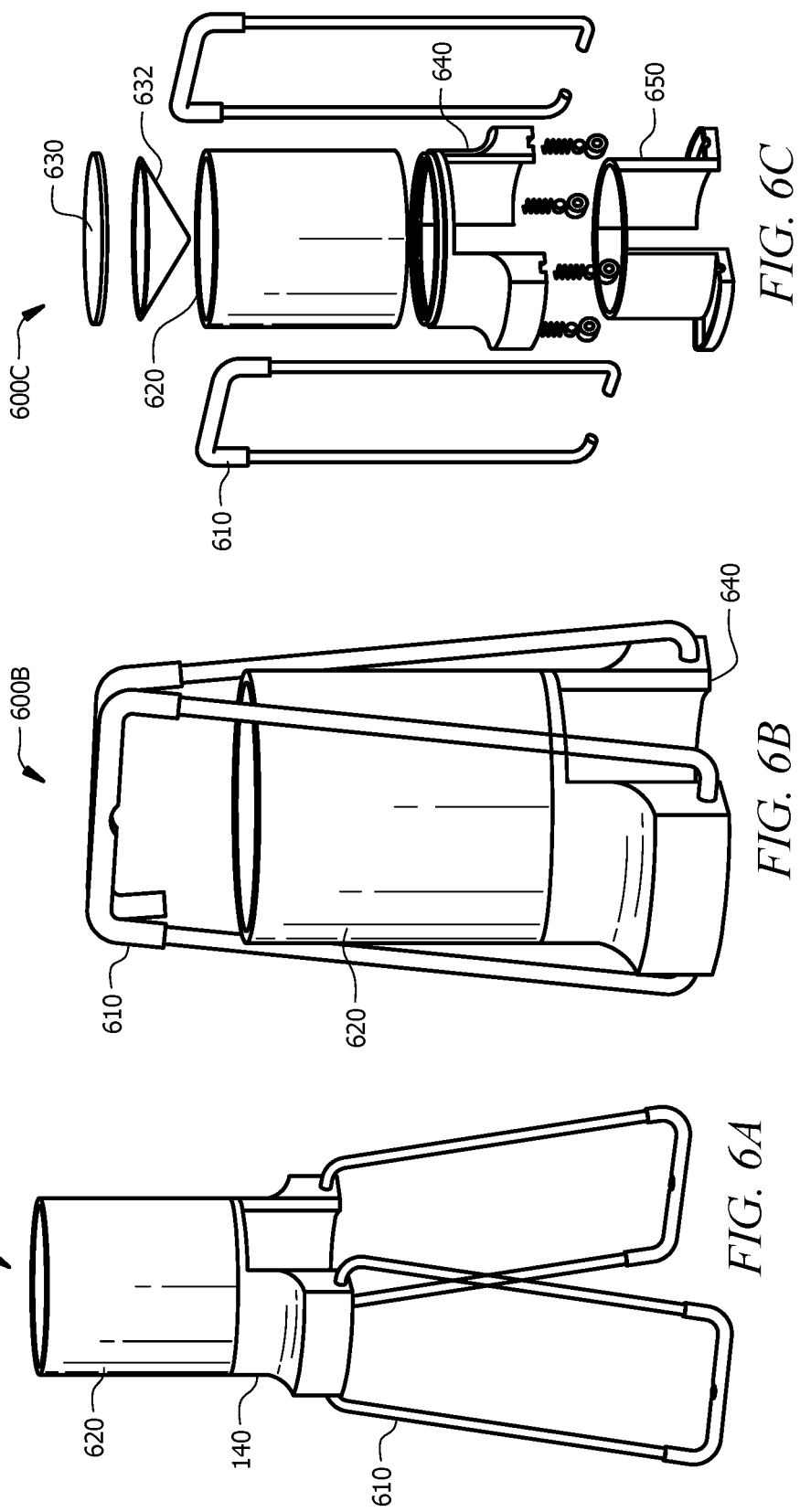

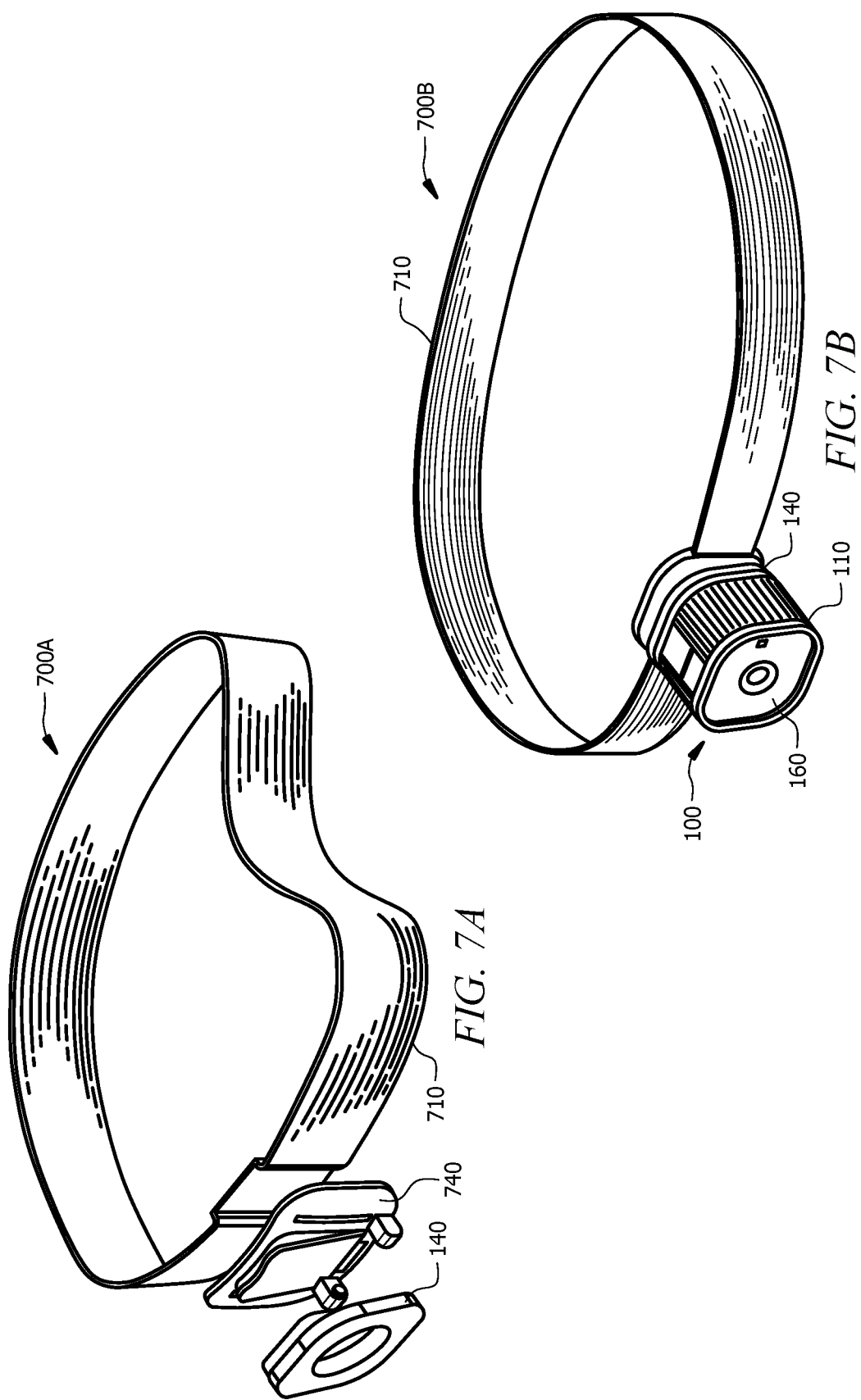

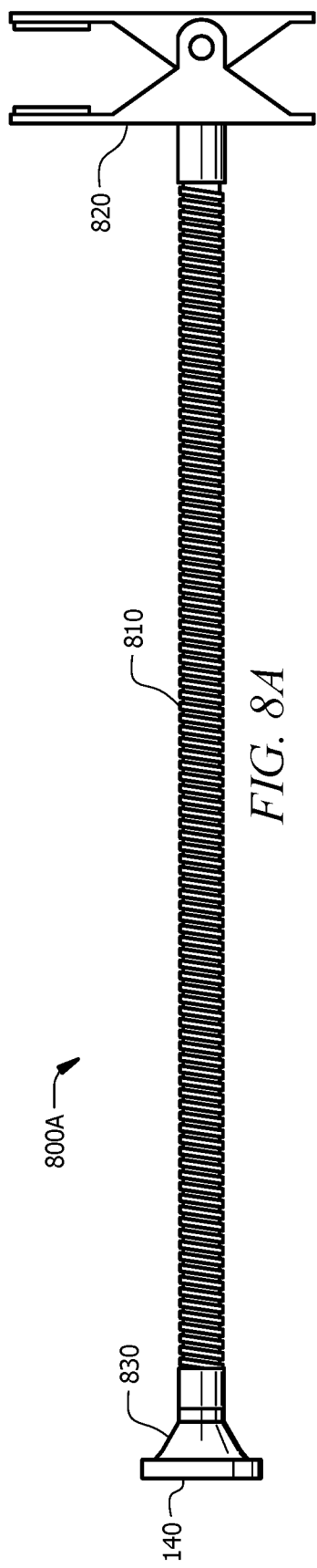
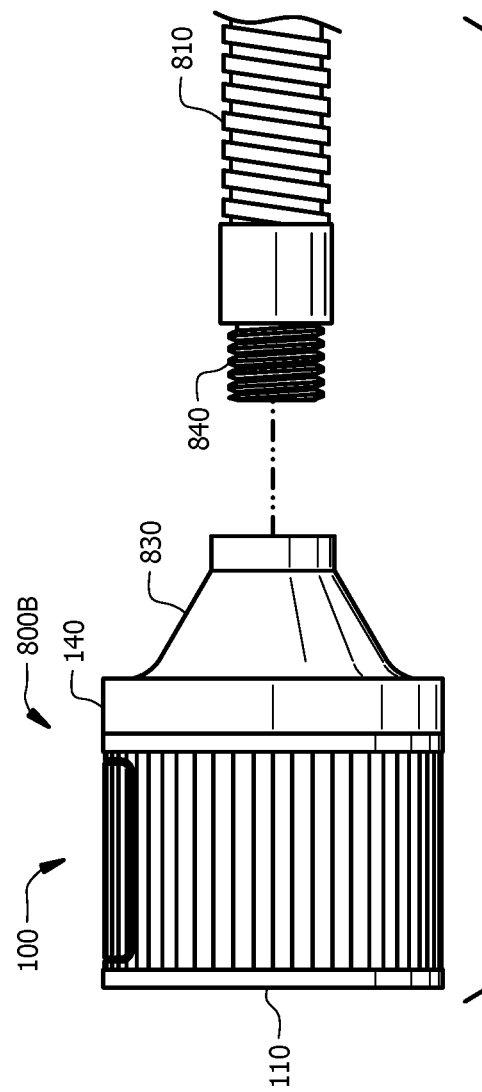
FIG. 8A
FIG. 8B

MODULAR SYSTEM

CROSS-REFERENCE TO RELATED APPLICATION

This application is a continuation of U.S. patent application Ser. No. 15/989,559 filed May 25, 2018, entitled "MODULAR SYSTEM," which is a continuation of U.S. patent application Ser. No. 15/293,060 filed Oct. 13, 2016, entitled "MODULAR LIGHTING SYSTEM," which is a continuation-in-part of U.S. application Ser. No. 15/211,904 filed Jul. 15, 2016, entitled "MODULAR LIGHTING SYSTEM," each incorporated herein by reference in their entirety.

TECHNICAL FIELD

The disclosure relates generally to a modular system. In particular, the disclosure relates to a modular system including a plurality of magnets that self-align and lock components of the modular system.

BACKGROUND

Modular systems are known to provide some degree of versatility and can be conveniently portable. Modular systems can be utilized in industries including, but not limited to, lighting, manufacturing, military, automotive, construction, oil & gas, home goods, marine, engineering, safety, industrial, medical etc. For example, portable lights are often unable to be adjusted and securely attach to a variety of accessories using a single portable light. Particularly because portable lights are too robust or too small in size, portable lights may not provide a structure capable of being securely attached to a variety of accessories. Generally, portable lighting does not provide the degree of versatility and performance desired by users, and battery-life or power cycles can be limited, therefore requiring new batteries, repair, and/or replacement of portable light components.

SUMMARY

Embodiments of the present disclosure generally provide a modular and a modular system including a plurality of magnets that self-align a pod casing with a pod accessory. At least one detent and at least one locking arm may mate and lock the pod casing against the pod accessory. It is an object of the present disclosure to provide a higher quality modular system and reduce costs associated with modular systems.

A modular system may include a pod casing including a protrusion arranged on an attachment face of the pod casing. At least one detent may be provided on the protrusion. A pod accessory may include an aperture that may be configured to receive the protrusion. At least one locking arm may be configured to mate and lock with the at least one detent. The pod accessory may be removable and interchangeable. At least one light-emitting diode (LED) may be fully enclosed inside the modular system. A first set of magnets may be arranged in the pod casing, and a second set of magnets may be arranged in the pod accessory. The first set of magnets may be configured to self-align with the second set of magnets and may secure the pod casing against the pod accessory. The modular system may operate without being attached to the pod accessory. The plurality of magnets may include a first set of magnets that may be arranged in the pod casing and a second set of magnets that may be arranged in the pod accessory. Polarities of the first set of magnets may attract opposite polarities of the second set of magnets that may pull and align the pod casing against the pod accessory. A power coupling may provide electrical contacts or a path for powering the modular system. Connecting the pod accessory to the pod casing may convert the modular system to another structure, such as a flashlight, a bike light, a lantern, a head lamp, and/or an arm. A first alignment indicator may be provided on the pod casing, and a second alignment indicator may be provided on the pod accessory. The first alignment indicator may align with the second alignment indicator, and may self-align and secure the pod casing against the pod accessory. A first universal serial bus (USB) port may be provided on a rear cap of the pod accessory to charge an external item. A second USB port may be provided on the rear cap of the pod accessory to receive a charge. A self-contained battery may be provided inside the pod casing, and the self-contained battery may be rechargeable. The pod casing may be configured to detach from the pod accessory.

A modular system may include a pod casing that may provide a protrusion that may be arranged on an attachment face of the pod casing. At least one detent may be provided on the protrusion. At least one removable pod accessory may include an aperture that may be configured to receive the protrusion. Further, the at least one removable pod accessory may be interchangeable. At least one light-emitting diode (LED) may be fully enclosed inside the modular system. A plurality of magnets may be arranged in the pod casing and on the at least one removable pod accessory. The plurality of magnets may be configured to self-align with one another and may secure the pod casing against the at least one removable pod accessory. The modular system may operate without being attached to a plurality of pod accessories. The plurality of magnets may include a first set of magnets that may be arranged in the pod casing and a second set of magnets that may be arranged on the at least one removable pod accessory. Polarities of the first set of magnets may attract opposite polarities of the second set of magnets that may pull and align the pod casing against the at least one removable pod accessory. A power coupling may provide electrical contacts or a path for powering the modular system. Connecting the at least one removable pod accessory to the pod casing may convert the modular system to another structure, such as a flashlight, a bike light, a lantern, a head lamp, and/or an arm. A first alignment indicator may be provided on the pod casing, and a second alignment indicator may be provided on the at least one removable pod accessory. At least one locking arm may be provided on the at least one removable pod accessory. The first alignment indicator may align with the second alignment indicator, and may self-align and secure the pod casing against the at least one removable pod accessory. The at least one locking arm may mate and lock with the at least one detent. A self-contained battery may be provided inside the pod casing, and the self-contained battery may be rechargeable. The pod casing may be configured to detach from the at least one removable pod accessory. The pod casing may detach from the at least one removable pod accessory in an insertion position. The pod casing may attach and lock against the pod accessory in a mounted position.

A modular system that may include a pod accessory that may provide a battery. The modular system may include a pod casing that may connect to the pod accessory. At least one spring contact plate may be configured to provide an electrical contact for the pod accessory and at least one spring contact plate may be configured to provide an electrical contact for the pod casing. A power coupling may be provided between the pod casing and the pod accessory. The power coupling may be arranged to provide a flow of current from the pod accessory to the pod casing. The battery may recharge the pod casing. The battery may provide an additional current to the pod casing, and a performance and run-time of the pod casing may be increased. At least one spring contact plate may be arranged to enable the power coupling and may power the pod accessory.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which:

FIG. 6A is a perspective view of an accessory component for a modular system including a stand according to an embodiment of the present disclosure;

FIG. 6B is a perspective view of the accessory component of FIG. 6A according to an embodiment of the present disclosure;

FIG. 6C is an exploded view of the accessory component of FIGS. 6A and 6B according to an embodiment of the present disclosure;

FIG. 7A is an exploded view of an accessory component for a modular system including a band according to an embodiment of the present disclosure;

FIG. 7B is a perspective view of the accessory component of FIG. 7A according to an embodiment of the present disclosure;

FIG. 8A is a side view of an accessory component for a modular system including a clamping mechanism according to an embodiment of the present disclosure;

FIG. 8B is an exploded side view of the accessory component of FIG. 8A including a connection piece according to an embodiment of the present disclosure;

DETAILED DESCRIPTION

The present disclosure generally provides a pod or a modular system that may be a single system using a plurality of magnets that may self-align a pod casing and a pod accessory. The modular system may provide reduce costs associated with utilizing the modular system. For example, the modular system may be applied to lighting applications and may produce a higher quality light source at a lower cost than conventional lighting systems. The pod may be a light-emitting diode (LED) light pod in an embodiment of the present disclosure.

Figure 1:
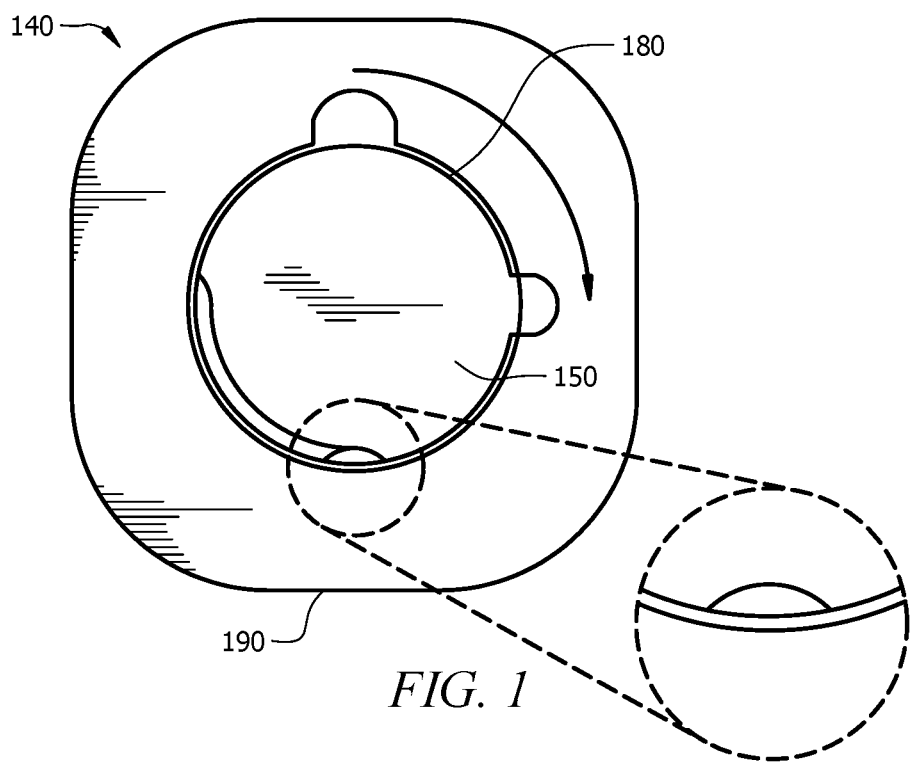
FIG. 1 is a view of a pod accessory including an undercut of a modular system according to an embodiment of the present disclosure.
Figure 2:
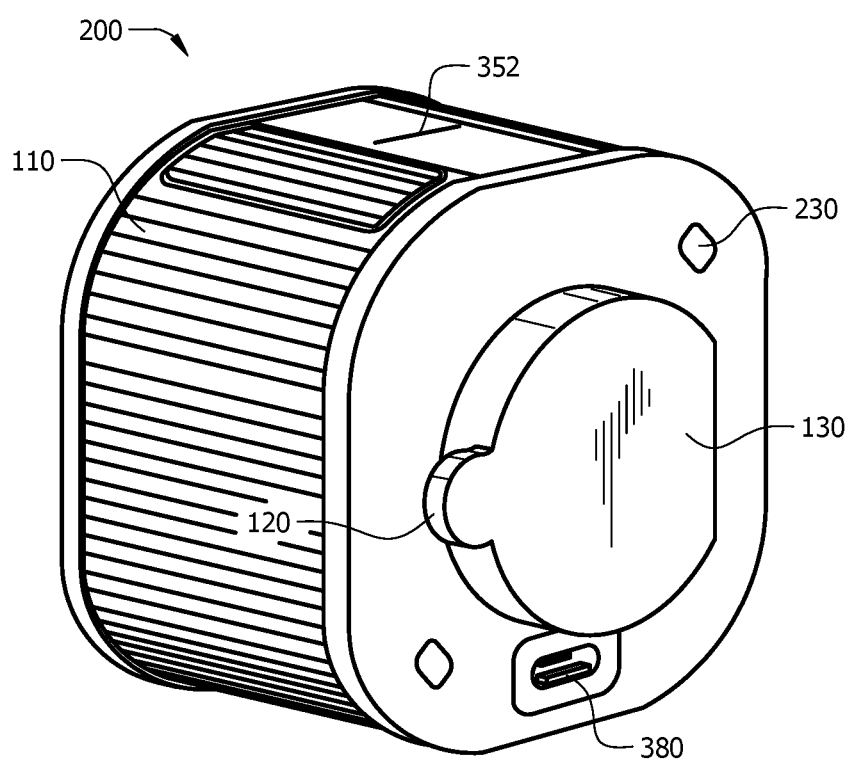
FIG. 2 is a rear perspective view of a modular system including a standalone pod casing according to an embodiment of the present disclosure.

FIG. 1 depicts pod accessory 140 including undercut 190 according to an embodiment of the present disclosure. Pod accessory 140 may provide recessed ring 180 and attachment aperture 150. Recessed ring 180 may include undercut 190 that may provide a recess that may fix pod casing 110 (FIGS. 2, 3A-3B, 5B, 6D, 7B, 7E, and 8B) inside of attachment aperture 150 and/or may prevent pod casing 110 (FIGS. 2, 3A-3B, 5B, 6D, 7B, 7E, and 8B) from shifting or moving out of place when secured in attachment aperture 150. Attachment aperture 150 may be shaped to receive and match with a shape of protrusion 120 (FIG. 2). Attachment aperture 150 may also provide a secure connection between pod casing 110 (FIGS. 2, 3A-3B, 5B, 6D, 7B, 7E, and 8B) and pod accessory 140. Undercut 190 may provide an indention that may help self-align pod casing 110 (FIGS. 2, 3A-3B, 5B, 6D, 7B, 7E, and 8B) against pod accessory 140. A secure connection between pod casing 110 (FIGS. 2, 3A-3B, 5B, 6D, 7B, 7E, and 8B) and pod accessory 140 may be formed and may secure pod casing 110 (FIGS. 2, 3A-3B, 5B, 6D, 7B, 7E, and 8B) with pod accessory 140 when protrusion 120 (FIG. 2) is tightly fit inside of recessed ring 180 utilizing undercut 190.

Figure 12:
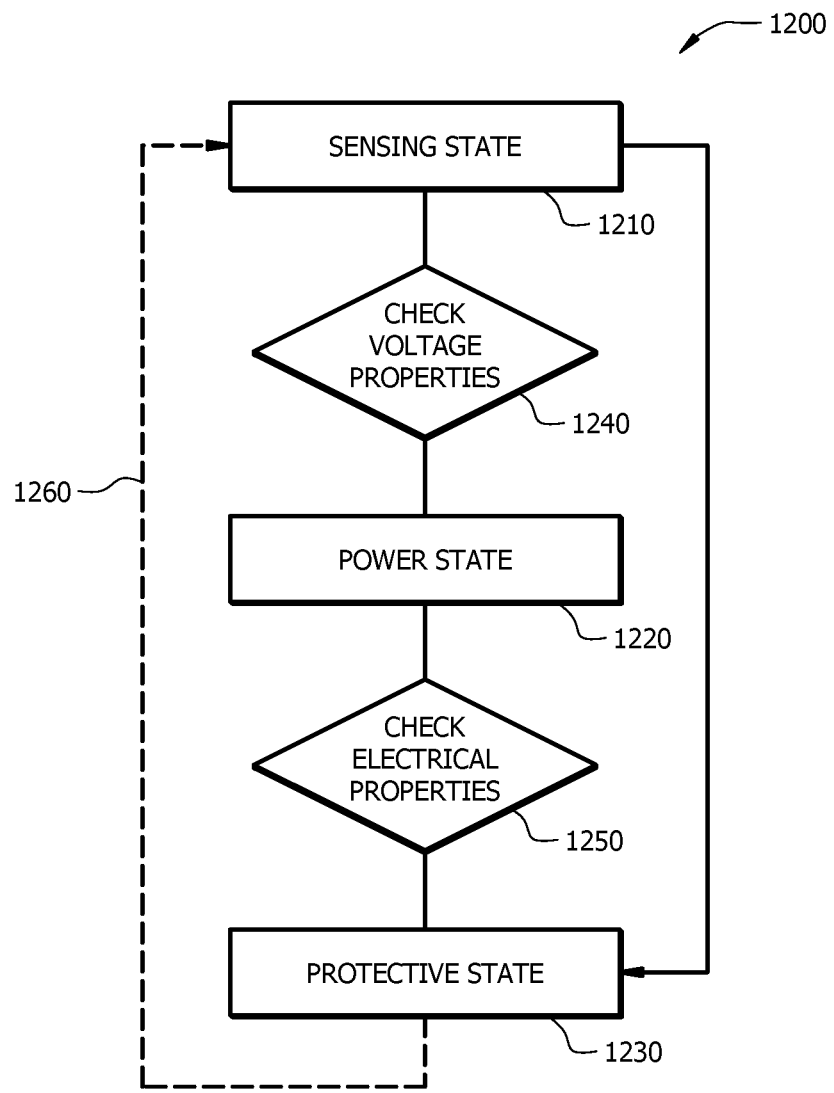
FIG. 12 depicts an operational process of a power coupling according to an embodiment of the present disclosure.

FIG. 2 is a rear perspective view 200 of a modular system including pod casing 110 having contacts 230 and universal serial bus (USB) port 380 according to an embodiment of the present disclosure. It should be appreciated that modular system 100 (FIGS. 5B, 6D, 7B, 7E, and 8B) may include light pipe 352 that may provide a backlight or illumination, particularly for low-light environments. Contacts 230 may be provided on attachment face 130 and may provide electrical connection points for power coupling 1100 (FIG. 12). It should be appreciated that contacts 230 may not be provided on attachment face 130 in some embodiments of the present disclosure. At least one detent 354 (FIGS. 3C, 3E, and 3F) may be provided on protrusion 120 and may lock with locking arms 572 (FIGS. 3E, 3F, and 5B) of an accessory. USB port 380 may be provided on attachment face 130 of modular system 100 (FIGS. 5B, 6D, 7B, 7E, and 8B). Pod casing 110 may provide protrusion 120 that may be received by attachment aperture 150 (FIG. 1). It should be appreciated that pod casing 110 may be made of any material including, but not limited to, rubber, plastic, and/or another material. Protrusion 120 may be provided on attachment face 130 of pod casing 110 and may provide a male coupling for attaching to a pod accessory and/or may be used as a standalone pod casing in embodiments of the present disclosure. Further, protrusion 120 may self-align inside of attachment aperture 150 (FIG. 1) and may secure a connection of pod casing 110 and pod accessory 140 (FIG. 1). Additionally, protrusion 120 may be secured inside of recessed ring 180 (FIG. 1) via a motion including, but not limited to, rotating inside recessed ring 180, sliding into recessed ring 180, snapping inside recessed ring 180, or any other means for forming a tight fit between protrusion 120 and recessed ring 180.

Figure 3A:
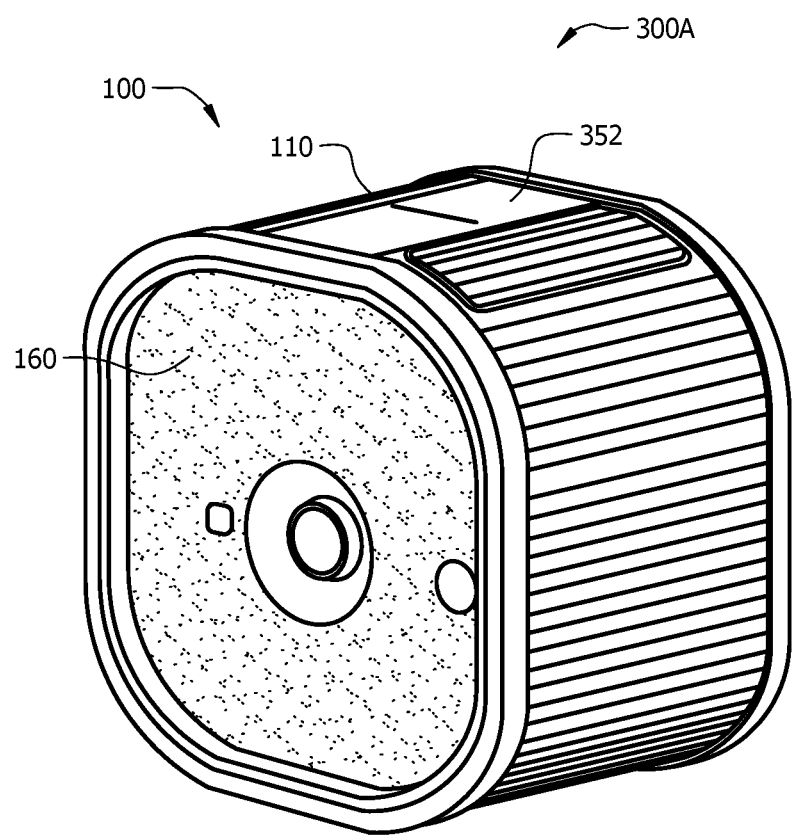
FIG. 3A is a front perspective view of a modular system including a standalone pod casing according to an embodiment of the present disclosure.

FIG. 3A is a front perspective view 300A of a modular system 100 including pod casing 110 having cover 160 according to an embodiment of the present disclosure. Cover 160 may provide a front closure for modular system 100, and pod casing 110 and may be formed of any material including, but not limited to, plastic, fiberglass, frosted, transparent, and/or tinted materials. In some embodiments of the present disclosure, modular system 100 may include light pipe 352. Light pipe 352 may be provided on an upper portion of pod casing 110. It should be appreciated that light pipe 352 may be provided at other locations of pod casing 110 without departing from the present disclosure. Buttons, switches, and/or other forms of controls may be provided inside pod casing 110 to control modes of modular system 100. It should be appreciated that the buttons, switches, and/or other forms of controls may provide controlling brightness, electrical current, color of lighting, strobe lighting, on/off capability, and other modes of modular system 100 in some embodiments of the present disclosure.

Figure 3B:
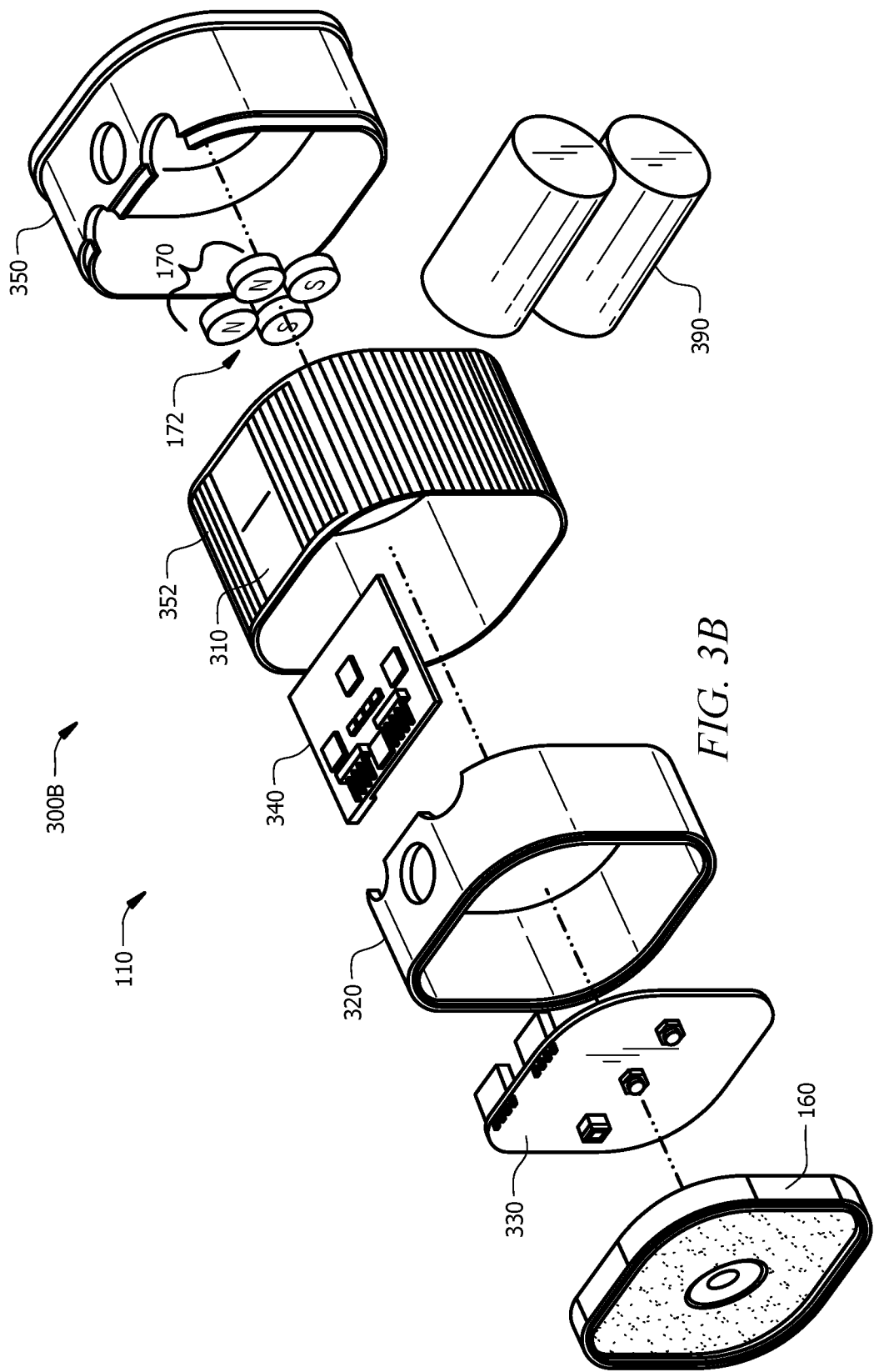
FIG. 3B is an exploded view of the modular system of FIG. 3A according to an embodiment of the present disclosure.

FIG. 3B is an exploded view 300B of a modular system including pod casing 110 according to an embodiment of the present disclosure. In some embodiments of the present disclosure, light-emitting diodes (LEDs) 330 may be provided on an electrical board and secured inside of a modular system or, more specifically, inside of pod casing 110. Pod casing 110 may include inner shell 320 that may secure and protect LEDs 330. LEDs 330 may be fully enclosed in a modular system or, more specifically, inside of pod casing 110 in embodiments of the present disclosure. Cover 160 may provide a front closure for LEDs 330 and may be surrounded by inner shell 320. It should be appreciated that cover 160 may be formed of any material including, but not limited to, plastic, fiberglass, frosted, transparent, and/or tinted materials. It should be appreciated that two or three LEDs may be utilized in a modular system in some embodiments of the present disclosure. It should further be appreciated that any number of LEDs may be utilized in a modular system without departing from the present disclosure. It should also be appreciated that LEDs may be high-powered, infrared, and/or tri-color red, green, and blue (RGB) LEDs without departing from the present disclosure. Pod casing 110 may be covered with rubber grip 310 that may provide traction to an exterior of pod casing 110. Electrical board 340 may be fully enclosed within pod casing 110 and may provide connection points for LEDs 330 and other electrical components. Light pipe 352 may be provided on an upper portion of pod casing 110. It should be appreciated that light pipe 352 may be provided at other locations along pod casing 110 without departing from the present disclosure.

Pod casing 110 may also include self-contained battery 390 that may be rechargeable and may be fully enclosed in a modular system. Self-contained battery 390 may be a rechargeable battery and may provide a runtime that may be longer than conventional batteries and/or rechargeable batteries. Self-contained battery 390 may provide an increased brightness compared to conventional batteries. It should be appreciated that any number of self-contained batteries may be utilized without departing from the present disclosure. It should be appreciated that a modular system may have an increased runtime and brightness compared to conventional portable lights when utilized for lighting applications according to embodiments of the present disclosure. It should further be appreciated that a modular system may be a standalone pod casing and may not be connected to pod accessories or accessory components in some embodiments of the present disclosure. It should also be appreciated that a modular system may include a pod casing and at least one accessory without departing from the present disclosure. A plurality of magnets 170 may be provided to attract other magnets and may be fully secured within pod casing 110. The plurality of magnets 170 may connect in which first set of magnets 172 may have polarities opposite second set of magnets 174 (FIGS. 9C and 9D). For example, the plurality of magnets 170 may include first set of magnets 172 that may have magnets with N, S, N, and S polarities, and second set of magnets 174 (FIGS. 9C and 9D) may have magnets with S, N, S, and N polarities. It should be appreciated that the polarities of first set of magnets 172 and second set of magnets 174 may be in any order or combination without departing from the present disclosure. For example, first set of magnets 172 that may have magnets with N, N, S, and S polarities, and second set of magnets 174 may have magnets with S, S, N, and N polarities. Rear body 350 of pod casing 110 may secure components within pod casing 110 and may be removable so that one or more pod casing components may be replaced or repaired.

Figure 3C:
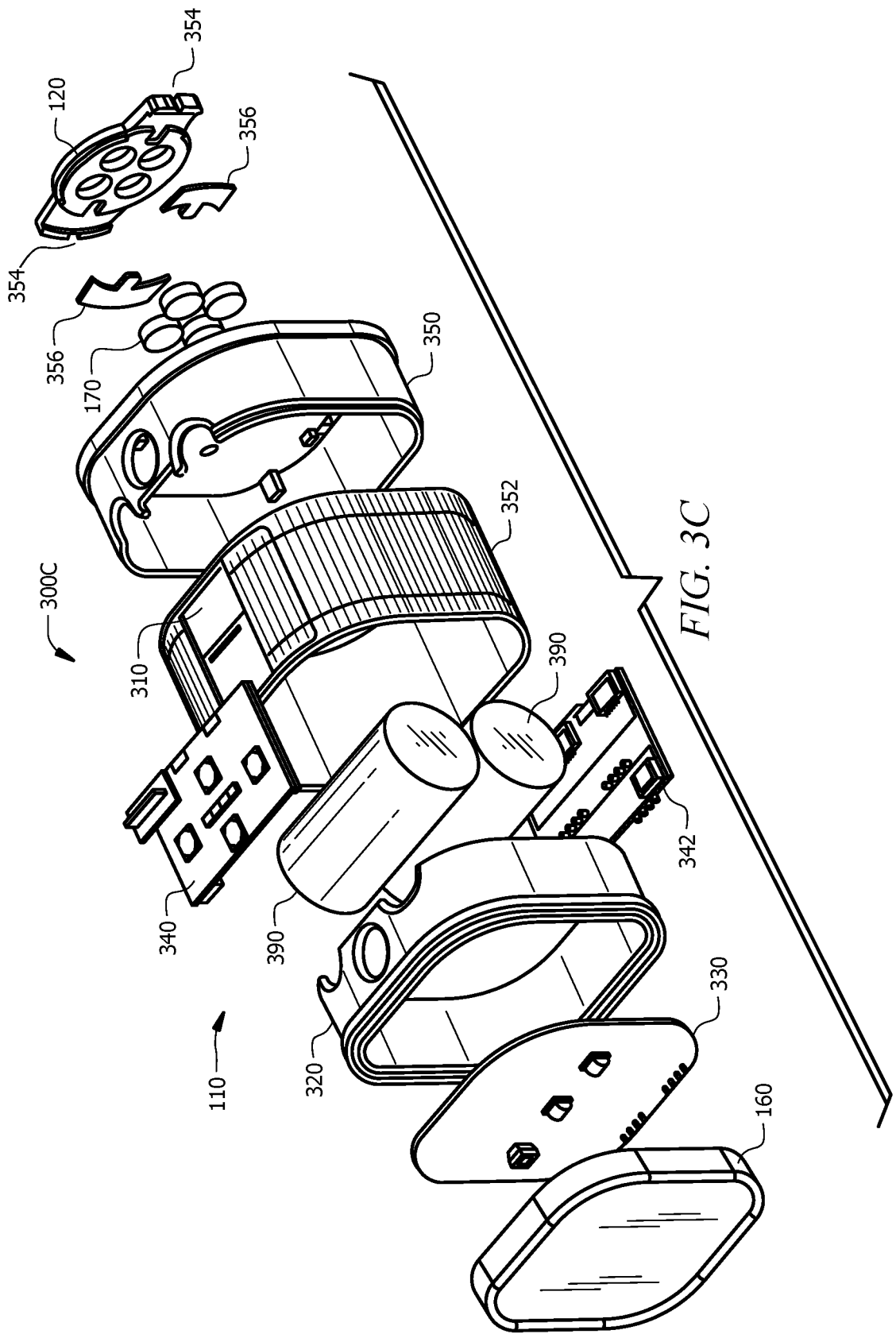
FIG. 3C is an exploded view of a modular system according to an embodiment of the present disclosure.

FIG. 3C is an exploded view 300C of a modular system including pod casing 110 according to an embodiment of the present disclosure. In some embodiments of the present disclosure, light-emitting diodes (LEDs) 330 may be provided on an electrical board and secured inside of a modular system or, more specifically, inside of pod casing 110. Pod casing 110 may include inner shell 320 that may secure and protect LEDs 330. LEDs 330 may be fully enclosed in a modular system or, more specifically, inside of pod casing 110 in embodiments of the present disclosure. Cover 160 may provide a front closure for LEDs 330 and may be surrounded by inner shell 320. It should be appreciated that cover 160 may be formed of any material including, but not limited to, plastic, fiberglass, frosted, transparent, and/or tinted materials. It should be appreciated that two or three LEDs may be utilized in a modular system in some embodiments of the present disclosure. It should further be appreciated that any number of LEDs may be utilized in a modular system without departing from the present disclosure. It should also be appreciated that LEDs may be high-powered, infrared, and/or tri-color red, green, and blue (RGB) LEDs without departing from the present disclosure.

Pod casing 110 may be covered with rubber grip 310 that may provide traction to an exterior of pod casing 110. First electrical board 340 and second electrical board 342 may be fully enclosed within pod casing 110 and may provide connection points for LEDs 330 and other electrical components. It should be appreciated that utilizing a plurality of electrical boards may provide smaller sized boards than utilizing a single electrical board; however, a single electrical board may be utilized without departing from the present disclosure.

In some embodiments of the present disclosure, light pipe 352 may be provided on an upper portion of pod casing 110. It should be appreciated that light pipe 352 may be provided at other locations along pod casing 110 without departing from the present disclosure. Rear body 350 of pod casing 110 may secure components within pod casing 110 and may be removable so that one or more pod casing components may be replaced or repaired. A plurality of magnets 170 may be provided to attract other magnets and may be fully secured within pod casing 110. Electrical contact plates 356 may be provided proximate the plurality of magnets 170 and may enable a power coupling of an accessory. Protrusion 120 may provide at least one detent 354 that may lock pod casing 110 to an accessory when the pod casing 110 is rotated against the accessory. At least one detent 354 may be provided on protrusion 120 and may lock with locking arms 572 (FIGS. 3E, 3F, and 5B) of an accessory.

Figure 3D:
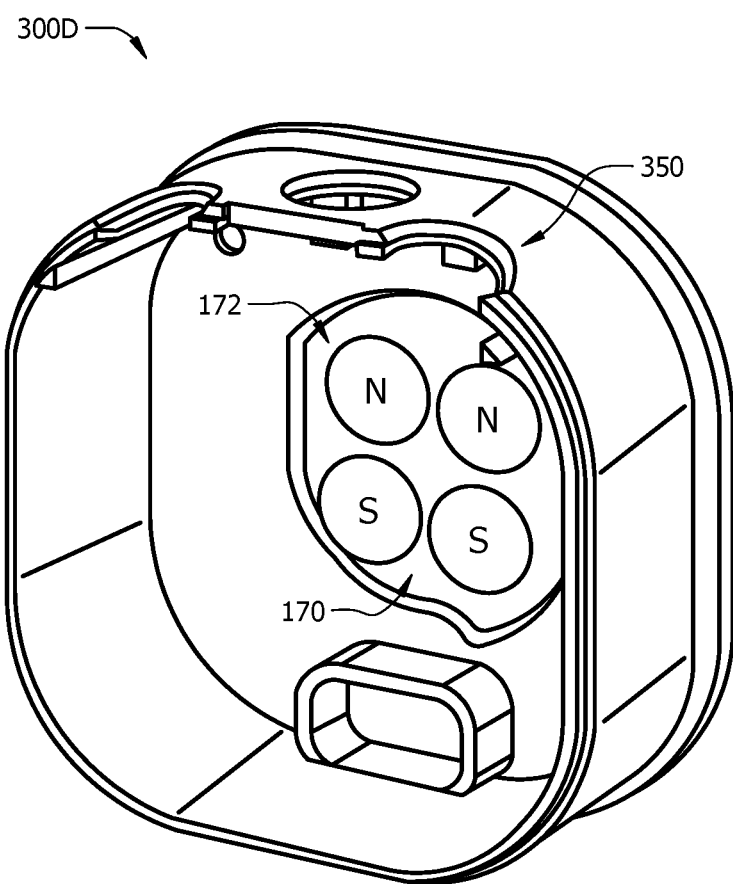
FIG. 3D is a perspective view of the rear body of the modular system of FIGS. 3A and 3B according to an embodiment of the present disclosure.

FIG. 3D is a perspective view 300D of rear body 350 of the modular system including a standalone pod casing as depicted in FIGS. 3A and 3B according to an embodiment of the present disclosure. A modular system may automatically self-align pod casing 110 (FIGS. 2, 3A-3B, 5B, 6D, 7B, 7E, and 8B) and pod accessory 140 (FIG. 5B) utilizing ring 180 (FIG. 1) and a plurality of magnets 170. The plurality of magnets 170 may connect in which first set of magnets 172 may have polarities opposite second set of magnets 174 (FIGS. 9C and 9D). For example, the plurality of magnets 170 may include first set of magnets 172 that may have magnets with N, S, N, and S polarities, and second set of magnets 174 (FIGS. 9C and 9D) may have magnets with S, N, S, and N polarities. It should be appreciated that the polarities of first set of magnets 172 and second set of magnets 174 may be in any order or combination without departing from the present disclosure. For example, first set of magnets 172 that may have magnets with N, N, S, and S polarities, and second set of magnets 174 may have magnets with S, S, N, and N polarities.

Figure 3E:
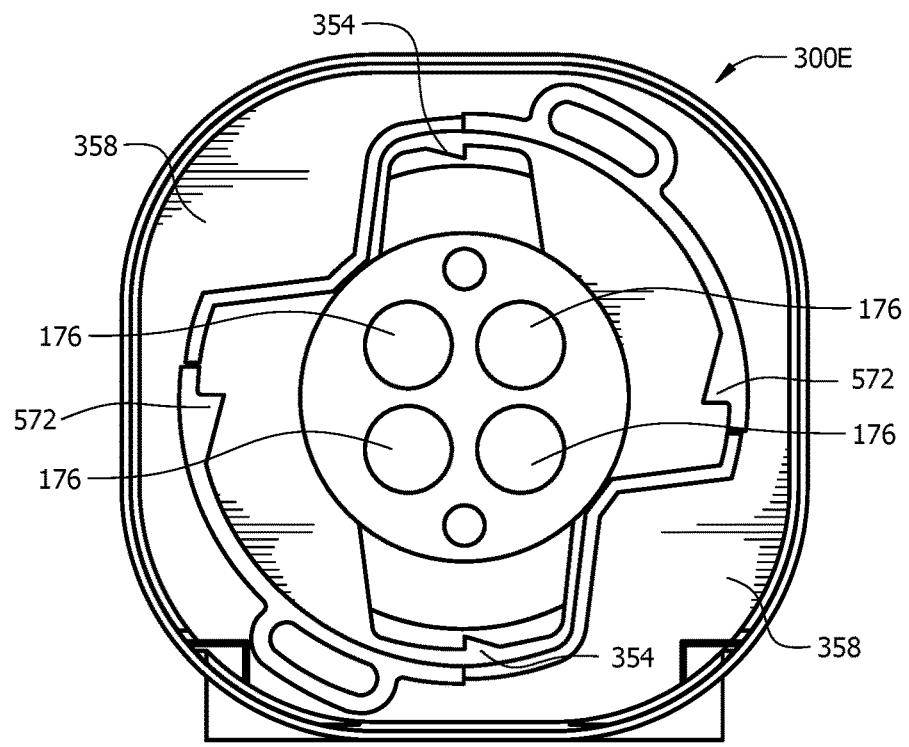
FIG. 3E is a sectional view of a modular system in an insertion position according to embodiment of the present disclosure.

FIG. 3E is a sectional view of a modular system in an insertion position 300E according to embodiment of the present disclosure. A plurality of magnets 170 (FIG. 3C) may be secured in spaces 176 that may be provided in insertion position 300E. Contact plates 356 (FIG. 3C) may be arranged proximate at least one detent 354 in contact areas 358. Insertion position 300E may provide at least one detent 354 arranged vertically at opposite sides or at a top and a bottom portion of the modular system. At least one detent 354 may unlock with locking arms 572 in insertion position 300E.

Figure 3F:
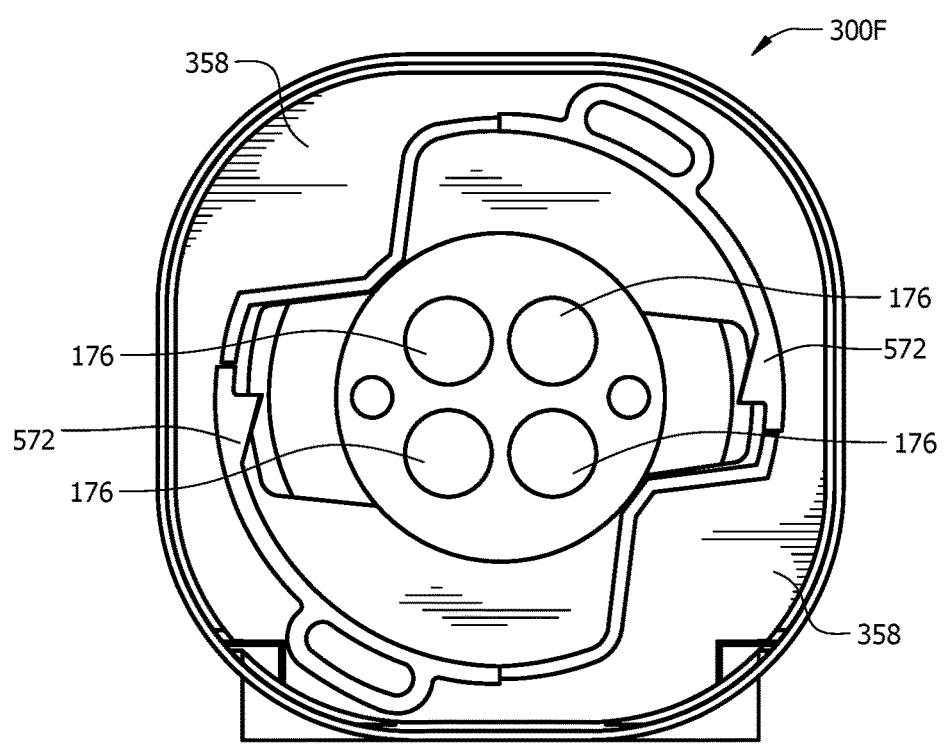
FIG. 3F is a sectional view of a modular system in a mounted position according to embodiment of the present disclosure.

FIG. 3F is a sectional view of a modular system in a mounted position 300F according to embodiment of the present disclosure. A plurality of magnets 170 (FIG. 3C) may be secured in spaces 176 that may be provided in mounted position 300F. Contact plates 356 (FIG. 3C) may be arranged proximate at least one detent 354 (FIGS. 3C and 3E) in contact areas 358. Mounted position 300F may provide at least one detent 354 (FIGS. 3C and 3E) arranged horizontally at opposite sides of the modular system. At least one detent 354 (FIGS. 3C and 3E) may mate and lock with locking arms 572 in mounted position 300F.

Figure 4A:
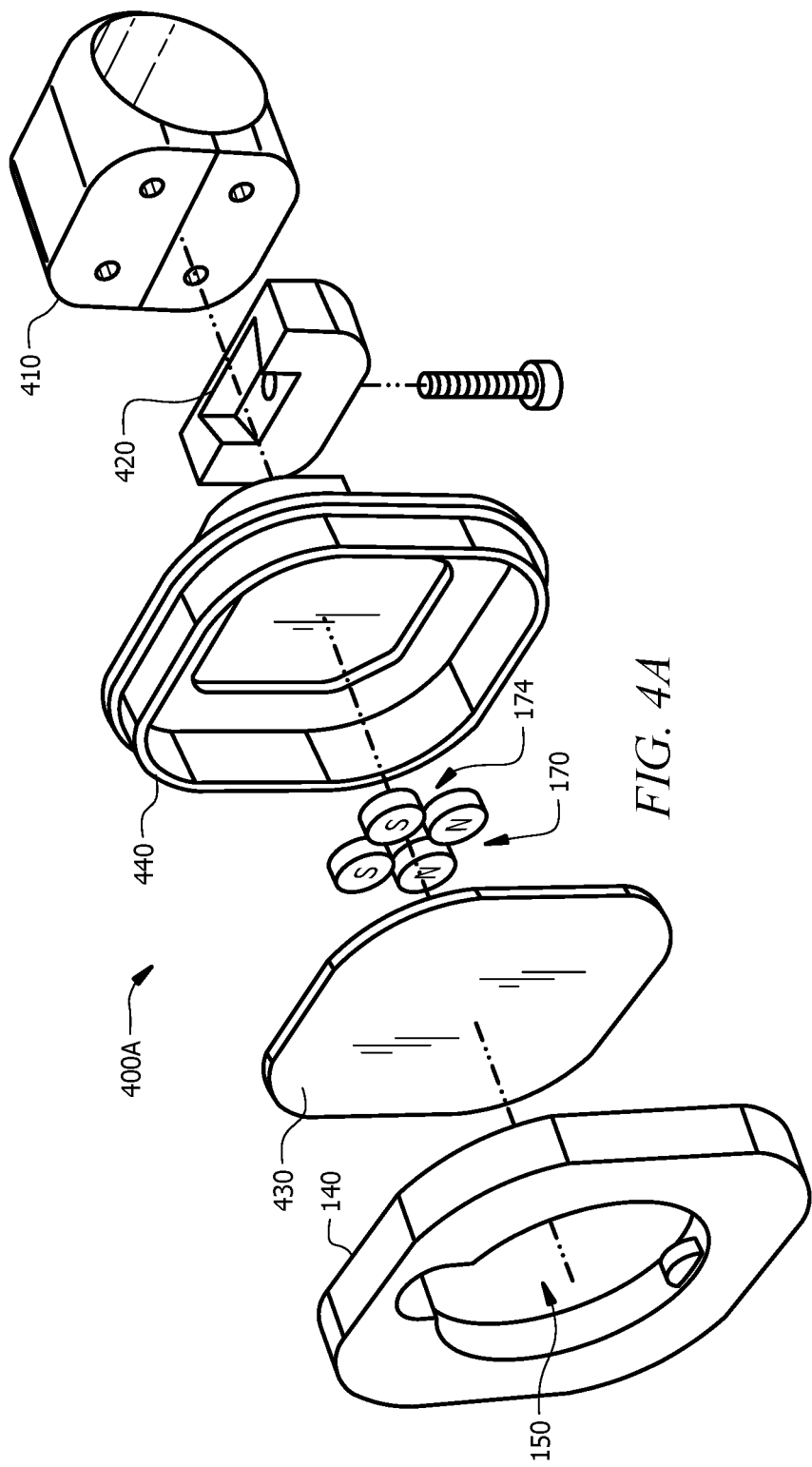
FIG. 4A is an exploded view of an accessory component for a modular system including an accessory extension according to an embodiment of the present disclosure.

FIG. 4A is an exploded view of accessory component 400A including handle bar mount or accessory extension 410 according to an embodiment of the present disclosure. Accessory component 400A may include pod accessory 140 that may provide attachment aperture 150. A plurality of magnets 170 may be provided to attract other magnets and may be secured in accessory component 400A between magnet divider 430 and rear coupling body 440. The plurality of magnets 170 may connect in which first set of magnets 172 (FIGS. 3B-3C and 9C-9D) may have polarities opposite second set of magnets 174. For example, the plurality of magnets 170 may include first set of magnets 172 (FIGS. 3B-3C and 9C-9D) that may have magnets with N, S, N, and S polarities, and second set of magnets 174 may have magnets with S, N, S, and N polarities. It should be appreciated that the polarities of first set of magnets 172 and second set of magnets 174 may be in any order or combination without departing from the present disclosure. For example, first set of magnets 172 that may have magnets with N, N, S, and S polarities, and second set of magnets 174 may have magnets with S, S, N, and N polarities. Accessory component 400A may include handle bar mount or accessory extension 410 that may be provided to connect modular system 100 (FIGS. 5B, 6D, 7B, 7E, and 8B) with an object including, but not limited to, bicycle handle bars. Dove tail lock 420 may be provided to connect with or attach to rear coupling body 440. Dove tail lock 420 may provide an attachment mechanism for attachment around an object including, but not limited to, handle bars. It should be appreciated that accessory component 400A may provide additional hardware or fasteners that may retain components within accessory component 400A.

Figure 4B:
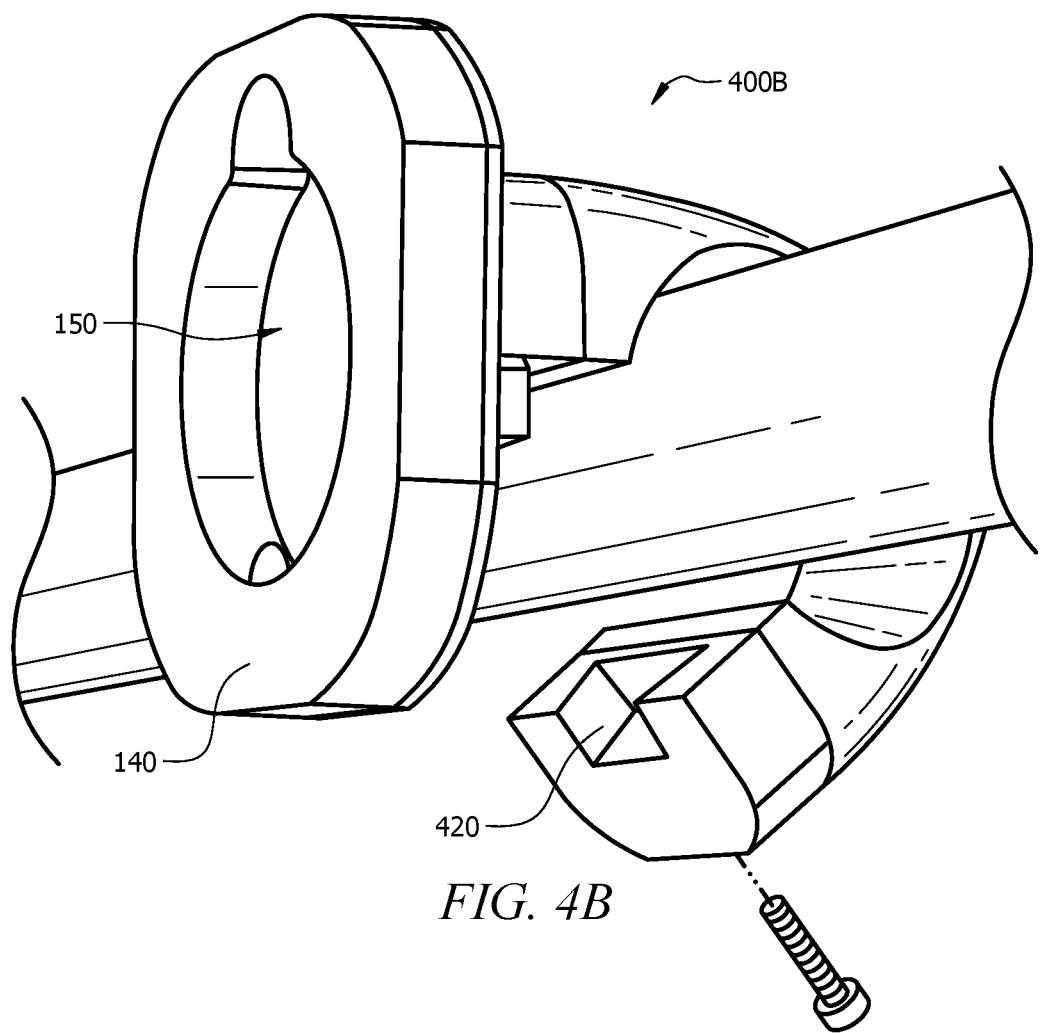
FIG. 4B is a view of the accessory component of FIG. 4A in an active position according to an embodiment of the present disclosure.

FIG. 4B is a view of accessory component 400B for modular system 100 (FIGS. 5B, 6D, 7B, 7E, and 8B) in an active position according to an embodiment of the present disclosure. Accessory component 400B may provide pod accessory 140 that may include attachment aperture 150. A portion of accessory component 400B may include dove tail lock 420 that may provide an attachment mechanism for attachment around an object including, but not limited to, handle bars. An active position of accessory component 400B may provide a secure connection to an object in which pod casing 110 (FIGS. 2, 3A-3B, 5B, 6D, 7B, 7E, and 8B) or modular system 100 (FIGS. 5B, 6D, 7B, 7E, and 8B) may be secured to pod accessory 140.

Figure 5A:
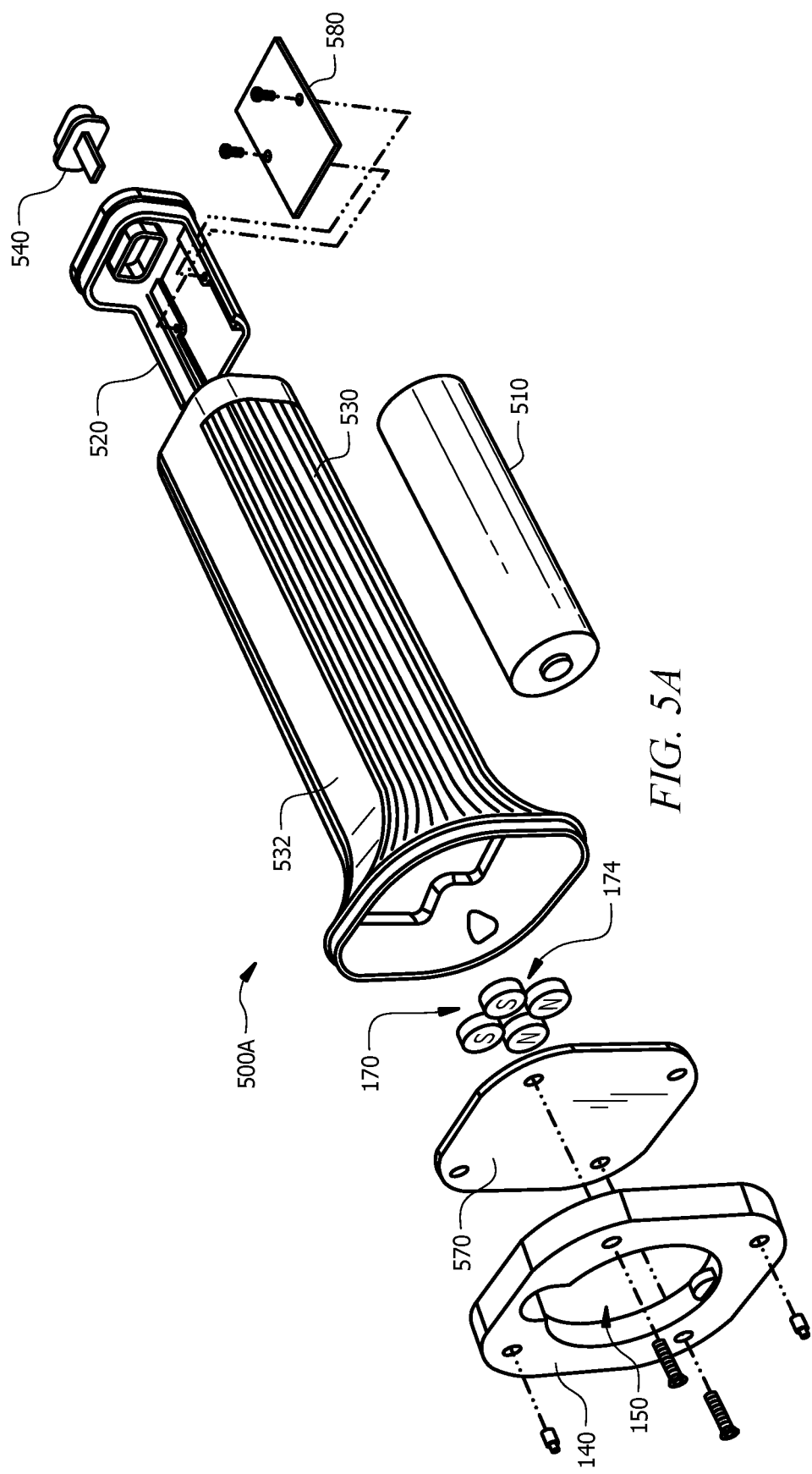
FIG. 5A is an exploded view of another accessory component for a modular system including a self-contained battery according to an embodiment of the present disclosure.
Figure 5B:
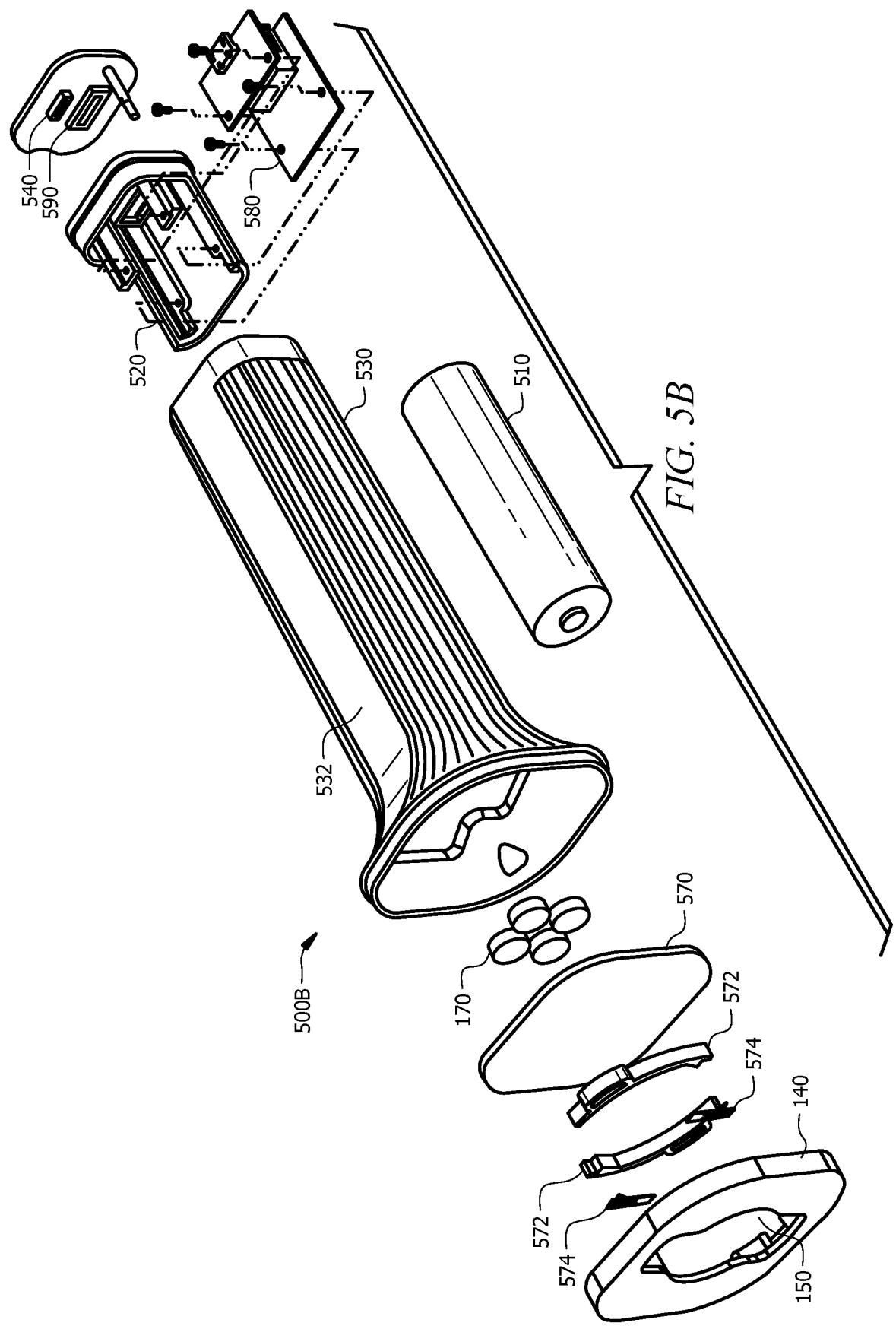
FIG. 5B is an exploded view of an accessory component for a modular system including a self-contained battery according to an embodiment of the present disclosure.

FIG. 5A is an exploded view of accessory component 500A including self-contained battery 510, rear cap 520, gripping mechanism 530, handle 532, and USB port 540 according to an embodiment of the present disclosure. An arrangement of handle 532 relative to pod casing 110 (FIGS. 2, 3A-3B, 5B, 6D, 7B, 7E, and 8B) may provide power coupling 550 (FIG. 5B). Power coupling 550 may provide a connection that may enable self-contained battery 510 to recharge, thus, recharging pod casing 110 (FIGS. 2, 3A-3B, 5B, 6D, 7B, 7E, and 8B). Handle 532 may connect to pod accessory 140 and may provide a structure for converting accessory component 500A to a flashlight or another structure. Gripping mechanism 530 may provide traction for an exterior of handle 532. It should be appreciated that gripping mechanism 530 may be a rubber cover or a similar type of material that may provide traction. Pod accessory 140 may provide attachment aperture 150 that may receive pod casing 110 (FIGS. 2, 3A-3B, 5B, 6D, 7B, 7E, and 8B) that may self-contain a light source or LEDs in some embodiments of the present disclosure. Handle 532 may fully enclose a plurality of magnets 170 (FIGS. 3B-4A, 5A, 7C-7D, 8C, and 9C-9D), and the plurality of magnets 170 may allow accessory component 500A to automatically self-align with a modular system. Magnetic divider 570 may secure the plurality of magnets 170 inside handle 532. The plurality of magnets 170 may connect in which first set of magnets 172 (FIGS. 3B-3C and 9C-9D) may have polarities opposite second set of magnets 174. For example, the plurality of magnets 170 may include first set of magnets 172 (FIGS. 3B-3C and 9C-9D) that may have magnets with N, S, N, and S polarities, and second set of magnets 174 may have magnets with S, N, S, and N polarities. It should be appreciated that the polarities of first set of magnets 172 and second set of magnets 174 may be in any order or combination without departing from the present disclosure. For example, first set of magnets 172 that may have magnets with N, N, S, and S polarities, and second set of magnets 174 may have magnets with S, S, N, and N polarities. Circuit board 580 may secure self-contained battery 510 inside handle 532 and may provide electrical connection points for electrical equipment. Rear cap 520 may secure components within handle 532 and may be removable so that components inside handle 532 may be replaced or repaired.

FIG. 5B is an exploded view of accessory component 500B including self-contained battery 510, rear cap 520, gripping mechanism 530, handle 532, spring contact plates 574, locking arms 572, first USB port 540, and second USB port 590 according to an embodiment of the present disclosure. An arrangement of handle 532 relative to pod casing 110 (FIGS. 2, 3A-3B, 5B, 6D, 7B, 7E, and 8B) may provide power coupling 550 (FIG. 5B). Power coupling 550 may provide a connection that may enable self-contained battery 510 to recharge, thus, recharging pod casing 110 (FIGS. 2, 3A-3B, 5B, 6D, 7B, 7E, and 8B). Gripping mechanism 530 may provide traction for an exterior of handle 532. It should be appreciated that gripping mechanism 530 may be a rubber cover or a similar type of material that may provide traction.

As shown in FIG. 5B, spring contact plates 574 may be configured to provide an electrical contact for accessory component 500B according to an embodiment of the present disclosure. Attachment aperture 150 may receive pod casing 110 (FIGS. 2, 3A-3B, 5B, 6D, 7B, 7E, and 8B) that may self-contain a light source or LEDs in some embodiments of the present disclosure. Handle 532 may fully enclose a plurality of magnets 170 (FIGS. 3B-4A, 5A, 7C-7D, 8C, and 9C-9D), and the plurality of magnets 170 may allow accessory component 500B to automatically self-align with a modular system. Magnetic divider 570 may secure the plurality of magnets 170 inside handle 532. Circuit board 580 may secure self-contained battery 510 inside handle 532 and may provide electrical connection points for electrical equipment. Rear cap 520 may secure components within handle 532 and may be removable so that components inside handle 532 may be replaced or repaired.

First USB port 540 may be provided on rear cap 520 and may provide a power input that may charge battery 510 and may provide power supplementation to battery 510. First USB port 540 may provide a 5-volt port for charging exterior items. Second USB port 590 may be provided on rear cap 520 and may provide a micro-port for receiving a charge. It should be appreciated that there may be embodiments where more or fewer USB ports may be provided. It also should be appreciated that the types of USB ports may change without departing from the present disclosure.

Figure 5C:
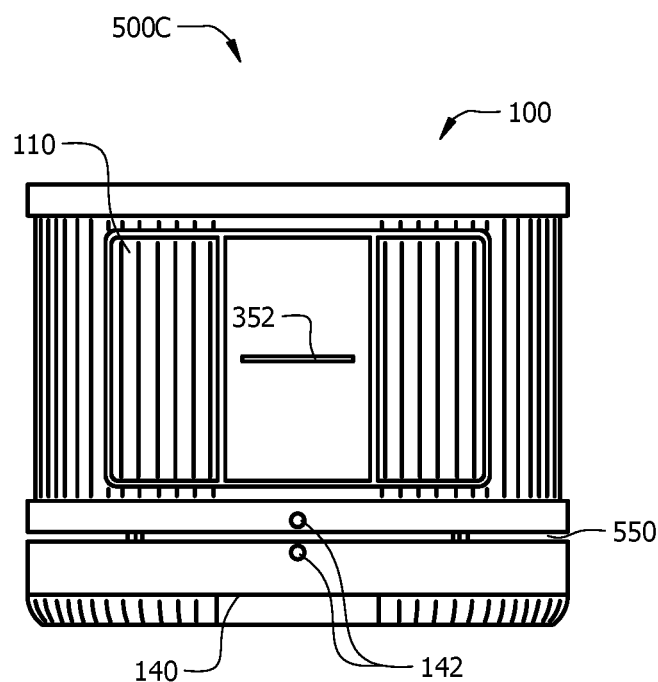
FIG. 5C is a top view of the accessory component of FIG. 5A according to an embodiment of the present disclosure.

FIG. 5C is a top view of accessory component 500C of FIG. 5A including power coupling 550 according to an embodiment of the present disclosure. Accessory component 500C may provide power coupling 550 in which a small gap may be provided to reduce friction between pod casing 110 (FIGS. 2, 3A-3B, 5B, 6D, 7B, 7E, and 8B) and pod accessory 140. Light pipe 352 may be provided on an upper portion of pod casing 110 (FIGS. 2, 3A-3B, 5B, 6D, 7B, 7E, and 8B). It should be appreciated that in embodiments including a light pipe, light pipe 352 may be provided at other locations along pod casing 110 (FIGS. 2, 3A-3B, 5B, 6D, 7B, 7E, and 8B) without departing from the present disclosure. Pod accessory 140 and pod casing 110 (FIGS. 2, 3A-3B, 5B, 6D, 7B, 7E, and 8B) may provide alignment indicators 142 that may guide a user in orienting pod casing 110 (FIGS. 2, 3A-3B, 5B, 6D, 7B, 7E, and 8B) relative to pod accessory 140. Alignment indicators 142 may be provided on pod casing 110 (FIGS. 2, 3A-3B, 5B, 6D, 7B, 7E, and 8B) and/or pod accessory 140 and may be utilized to properly align protrusion 120 (FIG. 2) inside of attachment aperture 150 (FIG. 1) and recessed ring 180 (FIG. 1). It should be appreciated that alignment indicators 142 may be color indicators; shaped in different configurations or shapes including, but not limited to, circles, triangles, diamonds, lines, and rectangles; depressions in modular system 100; and/or protrusions from modular system 100 without departing from the present disclosure. It should also be appreciated that alignment indicators 142 may not be utilized on modular system 100 in some embodiments of the present disclosure.

A secure connection may be formed when pod casing 110 is secured against pod accessory 140 and may secure pod casing 110 with pod accessory 140 when protrusion 120 (FIG. 2) is fit inside of recessed ring 180 (FIG. 1). Pod casing 110 may become detached from pod accessory 140 by rotating protrusion 120 (FIG. 2) and pod casing 110 out of recessed ring 180 (FIG. 1), pulling protrusion 120 and pod casing 110 away from recessed ring 180, and/or another means for detaching protrusion 120 and pod casing 110 from pod accessory 140. The motion of rotating, pulling and/or another means for detaching protrusion 120 and pod casing 110 from pod accessory 140 may detach or release pod casing 110 from pod accessory 140.

Figure 5D:
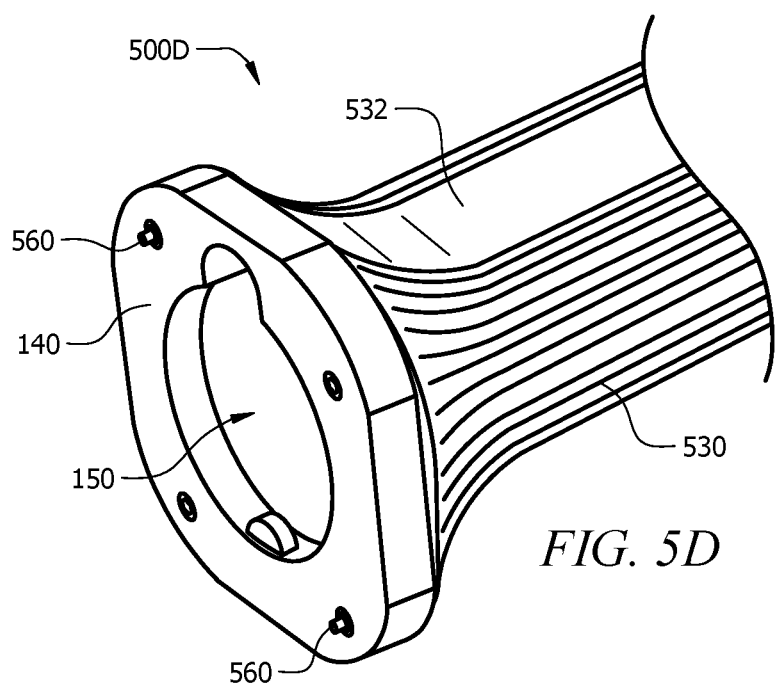
FIG. 5D is a front perspective view of the accessory component of FIGS. 5A and 5B according to an embodiment of the present disclosure.

FIG. 5D is a front perspective view of accessory component 500D for modular system 100 (FIGS. 5B, 6D, 7B, 7E, and 8B) according to an embodiment of the present disclosure. Accessory component 500D may provide connector pins 560 that may be included in power coupling 550 (FIG. 5B) to attach pod casing 110 (FIGS. 2, 3A-3B, 5B, 6D, 7B, 7E, and 8B) to pod accessory 140. It should be appreciated that any number of connector pins may be utilized without departing from the present disclosure. Attachment aperture 150 may provide a secure connection between pod casing 110 (FIGS. 2, 3A-3B, 5B, 6D, 7B, 7E, and 8B) and pod accessory 140. Gripping mechanism 530 may provide traction for handle 532. It should be appreciated that gripping mechanism 530 may be a rubber cover or another similar type of material that may provide traction.

FIGS. 6A and 6B depict accessory components 600A, 600B including base body 640 (FIG. 6B) and stand 610 according to an embodiment of the present disclosure. Illuminating cover 620 may connect to base body 640 (FIG. 6B) and may provide a structure for converting accessory components 600A, 600B to a lantern, lamp, or another structure. It should be appreciated that illuminating cover 620 may provide a structure for converting accessory components 600A, 600B to structures for non-lighting applications in some embodiments of the present disclosure. Stand 610 may provide two legs that may rotate to form accessory component 600A in which a pendant mode may be formed. Stand 610 may provide two legs that may rotate to form accessory component 600B in which a tabletop mode may be formed. It should be appreciated that any number of legs may be utilized without departing from the present disclosure. It should further be appreciated that stand 610 may provide rubber gripping members or gripping members made of another type of material on portions of stand 610 or legs that may contact a surface. Illuminating cover 620 may connect to pod accessory 140 (FIG. 6A) by snapping or sliding onto base body 640 in some embodiments of the present disclosure. When illuminating cover 620 is utilized, it may fully enclose a plurality of magnets 170 (3B-4A, 5A, 7C-7D, 8C, and 9C-9D), and the plurality of magnets 170 (FIGS. 3B-4A, 5A, 7C-7D, 8C, and 9C-9D) may allow accessory components 600A, 600B to automatically self-align with a modular system. It should further be appreciated that illuminating cover 620 may be frosted, transparent, tinted, or provide any type of color and/or texture without departing from the present disclosure. Closure or lid 630 (FIG. 6C) may secure components within illuminating cover 620 and may be removable so that components inside illuminating cover 620 may be replaced or repaired.

Figure 6D:
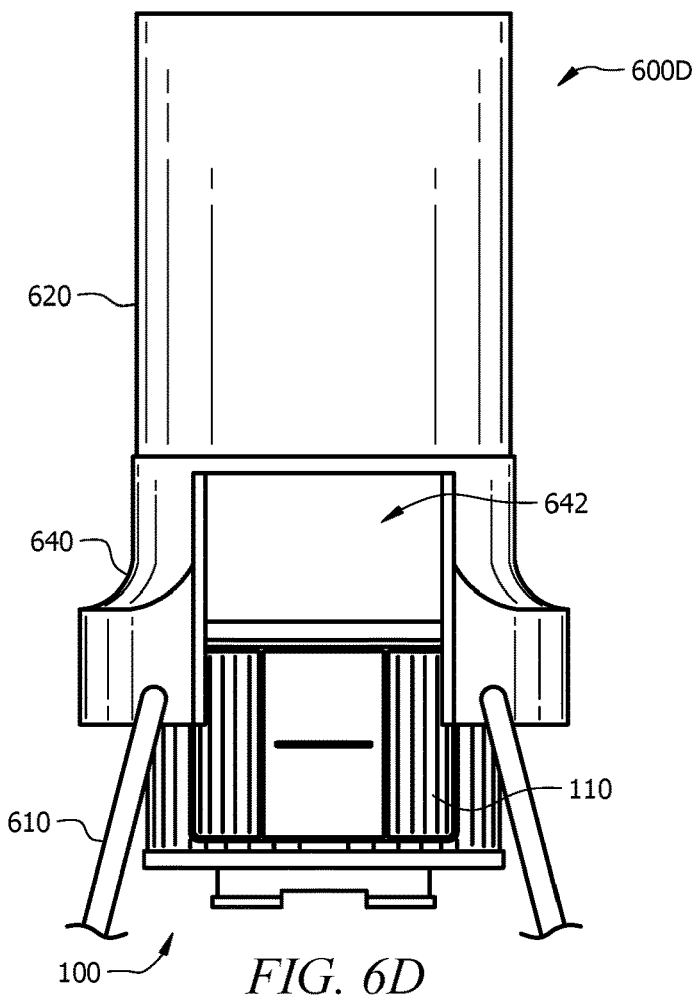
FIG. 6D is the accessory component of FIGS. 6A-6C including a friction fit gap according to an embodiment of the present disclosure.

FIG. 6C is an exploded view of accessory component 600C including reflector 632 and inner base 650 according to an embodiment of the present disclosure. Illuminating cover 620 may slide onto base body 640 in some embodiments of the present disclosure. Inner base 650 may provide a diameter that may be less than a diameter of base body 640, and as such, base body 640 may slide over inner base 650. It should be appreciated that a connection of base body 640 and inner base 650 may provide an open space to form a coupling for pod casing 110 (FIGS. 2, 3A-3B, 5B, 6D, 7B, 7E, and 8B). Stand 610 may provide two legs that may rotate to form accessory component 600C.

FIG. 6D depicts accessory component 600D for modular system 100 including friction fit gap 642 according to an embodiment of the present disclosure. Friction fit gap 642 may provide a space that may receive pod casing 110 of modular system 100. Friction fit gap 642 may be sized to provide a tight connection between pod casing 110 and base body 640. Stand 610 may provide two legs that may rotate to form accessory component 600D. Illuminating cover 620 may slide onto and securely rest against base body 640.

Figure 6E:
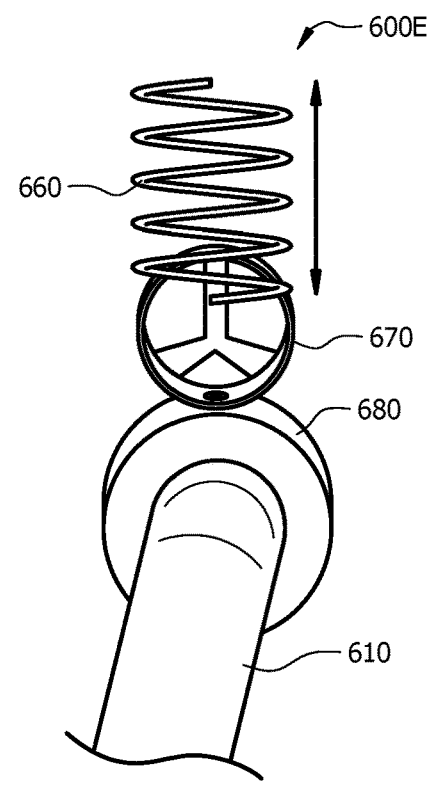
FIG. 6E is the leg mechanism for the accessory component of FIGS. 6A-6D including a spring, ball bearing, and a ball detent according to an embodiment of the present disclosure.

FIG. 6E depicts accessory component leg mechanism 600E for a modular system including spring 660, ball bearing 670, and ball detent 680 according to an embodiment of the present disclosure. Ball detent 680 may be two-sided to provide two locking positions for stand 610. It should be appreciated that a first locking position may be for one leg and a second locking position may be for a second leg of stand 610. An arrangement of spring 660, ball bearing 670, and ball detent 680 may provide simple movement of stand 610 about apertures of base body 640 (FIGS. 6A-6D).

Figure 7C:
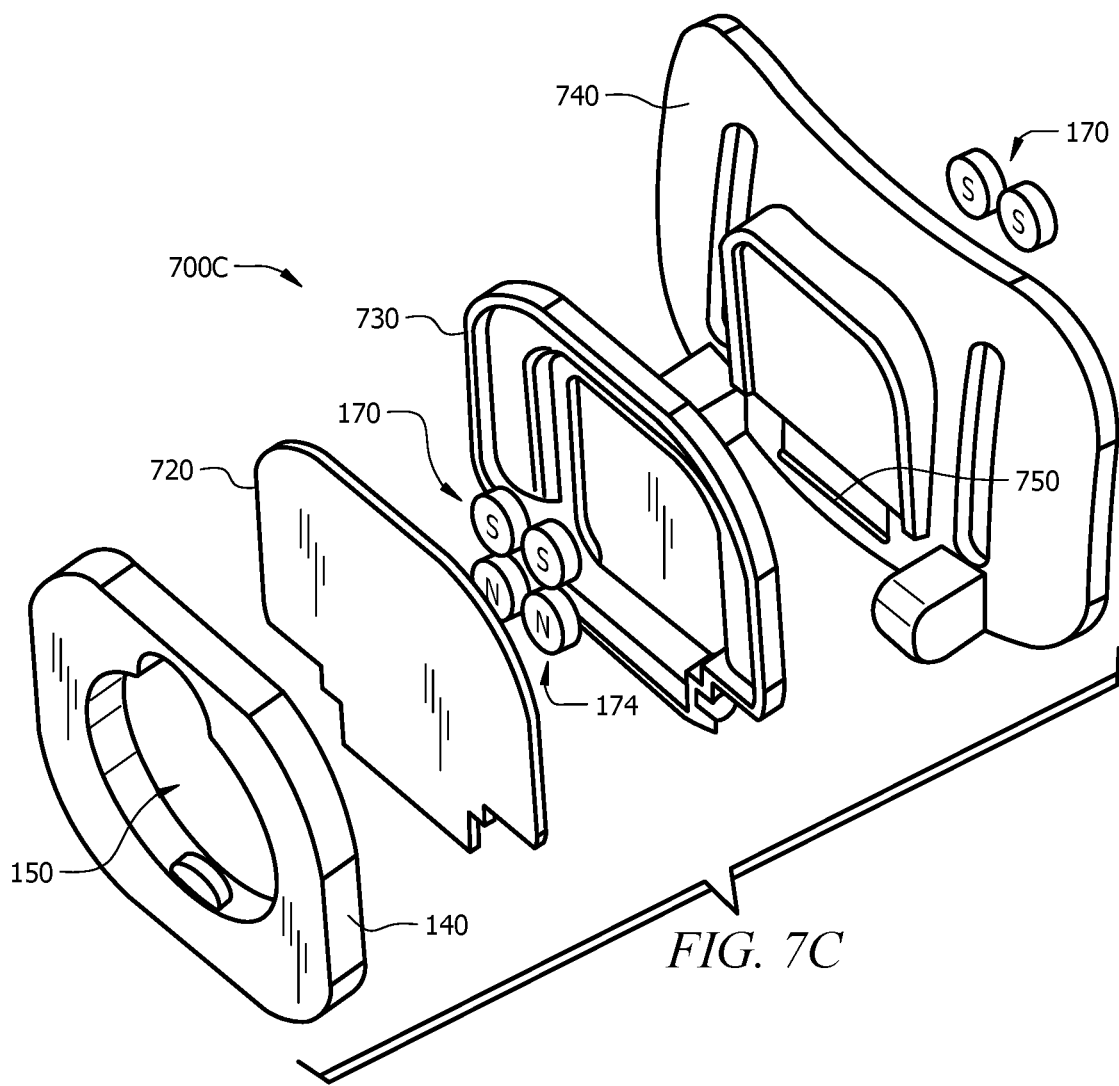
FIG. 7C is an exploded view of the accessory component of FIGS. 7A and 7B according to an embodiment of the present disclosure.

FIGS. 7A-7B depict accessory components 700A, 700B including band 710 according to an embodiment of the present disclosure. Band 710 may connect to pod accessory 140 opposite lens 160 (FIG. 7B) and may provide a structure for converting accessory components 700A, 700B to a headlamp, belt, or another structure. It should be appreciated that band 710 may provide a structure for converting accessory components 700A, 700B to structures for non-lighting applications in some embodiments of the present disclosure. Pod casing 110 (FIGS. 2, 3A-3B, 5B, 6D, 7B, 7E, and 8B) may attach to pod accessory 140, and modular system 100 (FIG. 7B) may be operational on band 710. It should be appreciated that a plurality of magnets 170 (FIGS. 3B-4A, 5A, 7C-7D, 8C, and 9C-9D) may be provided inside of band 710 or in a component that may be connected to band 710. It should further be appreciated that the plurality of magnets 170 (FIGS. 3B-4A, 5A, 7C-7D, 8C, and 9C-9D) may allow accessory components 700A, 700B to automatically self-align with a modular system. For example, the plurality of magnets 170 may be secured to accessory components 700A, 700B proximate head strap fixture 740 when utilized for lighting applications in some embodiments of the present disclosure.

FIG. 7C is an exploded view of accessory component 700C for a modular system according to an embodiment of the present disclosure. Accessory component 700C may provide pod accessory 140 that may provide attachment aperture 150. A plurality of magnets 170 may be provided to attract other magnets and may be secured in accessory component 700C between magnet divider 720 and coupling body 730. The plurality of magnets 170 may connect in which first set of magnets 172 (FIGS. 3B-3C and 9C-9D) may have polarities opposite second set of magnets 174. For example, the plurality of magnets 170 may include first set of magnets 172 (FIGS. 3B-3C and 9C-9D) that may have magnets with N, S, N, and S polarities, and second set of magnets 174 may have magnets with S, N, S, and N polarities. It should be appreciated that the polarities of first set of magnets 172 and second set of magnets 174 may be in any order or combination without departing from the present disclosure. For example, first set of magnets 172 that may have magnets with N, N, S, and S polarities, and second set of magnets 174 may have magnets with S, S, N, and N polarities. A plurality of magnets 170 may also be secured proximate head strap fixture 740 in embodiments of the present disclosure. Accessory component 700C may include flexible latch 750 that may provide an attachment to band 710 (FIGS. 7A and 7B).

Figure 7D:
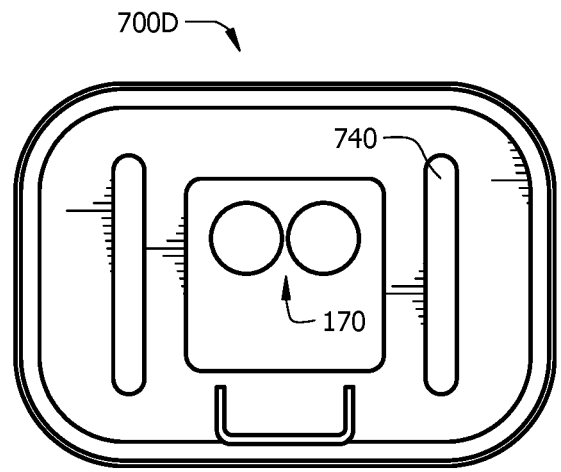
FIG. 7D is a front view of the accessory component of FIGS. 7A-7C including magnets according to an embodiment of the present disclosure.

FIG. 7D is a front view of accessory component 700D including a plurality of magnets 170 according to an embodiment of the present disclosure. Accessory component 700D may provide head strap fixture 740 that may include apertures arranged to attach band 710 (FIGS. 7A and 7B) to accessory component 700D in some embodiments of the present disclosure. It should be appreciated that head strap fixture 740 may be attached to other items without departing from the present disclosure.

Figure 7E:
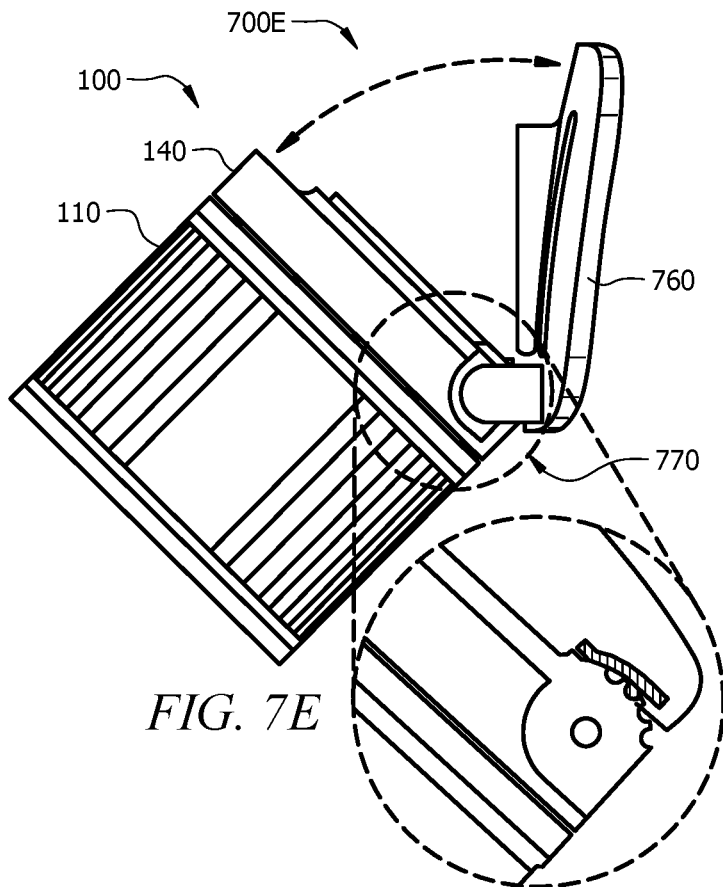
FIG. 7E is a side perspective view of the accessory component of FIGS. 7A-7D including an articulating arm according to an embodiment of the present disclosure.

FIG. 7E is a side perspective view of accessory component 700E including articulating arm 760 according to an embodiment of the present disclosure. Accessory component 700E may provide pod casing 110 and pod accessory 140 of modular system 100 that may be secured to articulating arm 760 that may include a plurality of teeth 770 to lock articulating arm 760. It should be appreciated that magnets 170 (FIG. 7D) may provide a mechanism for holding modular system 100 in a stable position when connected to an object, such as, band 710 (FIGS. 7A and 7B). It should further be appreciated that accessory component 700E may snap itself in place on an object when articulating arm 760 is fully closed.

FIG. 8A depicts side view of arm 800A including threaded arm 810 and clamp 820 according to an embodiment of the present disclosure. Threaded arm 810 may provide clamp 820 at a first end, and pod accessory 140 and rear body 830 at a second end opposite the first end. It should be appreciated that threaded arm 810 may be a flexible, gooseneck arm of any length without departing from the present disclosure. It should be appreciated that arm 800A may have different lengths and may provide properties including, but not limited to, extensible, bendable, and articulating. It should be appreciated that clamp 820 may be in form of a clamp including, but not limited to, a needle-nose clamp, a rail clamp, and a spring clamp.

FIG. 8B depicts exploded side view 800B of arm 810 of FIG. 8A including pod casing 110 and pod accessory 140 of modular system 100 and rear body 830 according to an embodiment of the present disclosure. Connection piece 840 may provide threads configured to attach and detach threaded arm 810 to and from pod casing 110 and rear body 830.

Figure 8C:
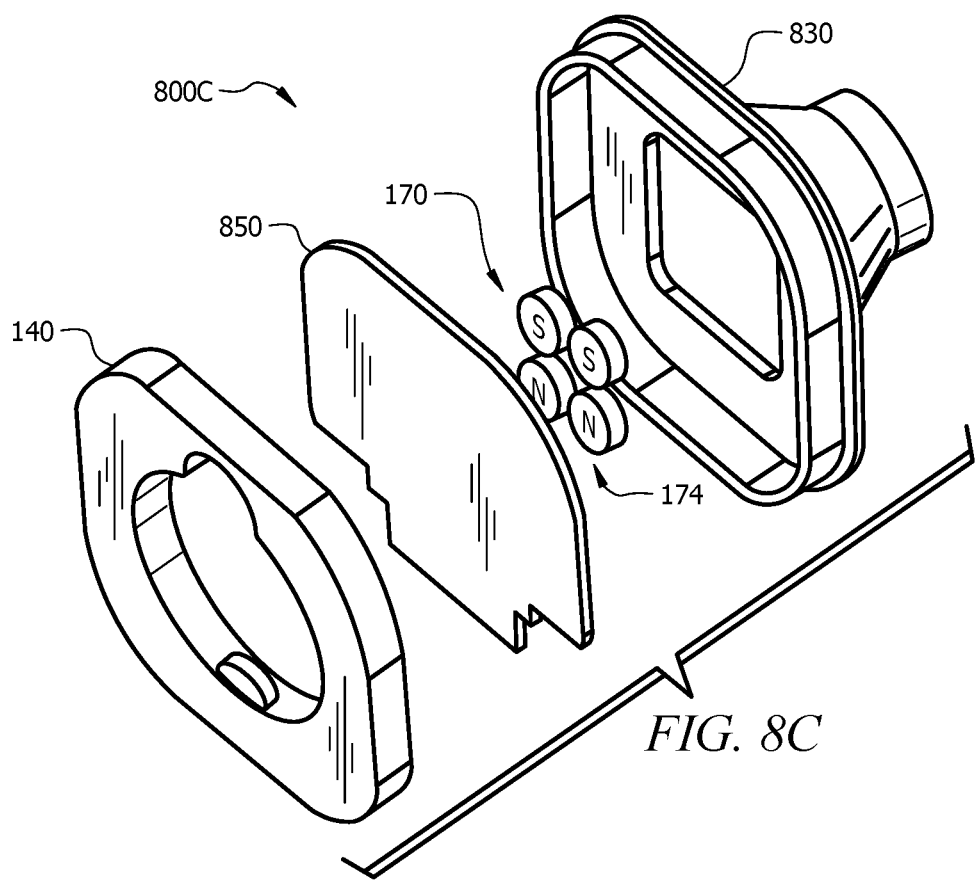
FIG. 8C is an exploded perspective view of the accessory component of FIGS. 8A and 8B including a rear body, magnets, and a pod accessory according to an embodiment of the present disclosure.

FIG. 8C depicts exploded perspective view 800C of rear body 830 including pod accessory 140, magnet divider 850, and a plurality of magnets 170 according to an embodiment of the present disclosure. A plurality of magnets 170 may be provided to attract other magnets and may be secured in accessory component 800C between magnet divider 850 and rear body 830.

Figure 9A:
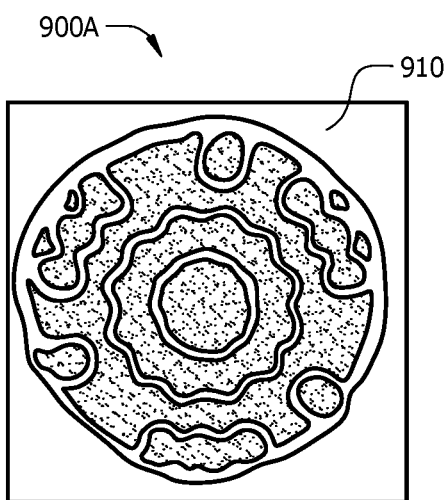
FIG. 9A depicts customized polarization of a self-aligning magnet including a magnet design according to an embodiment of the present disclosure.
Figure 9B:
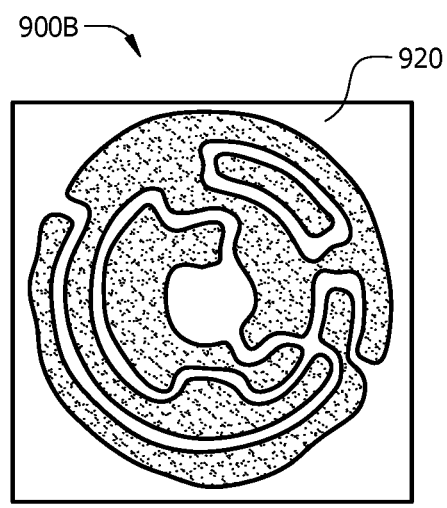
FIG. 9B depicts customized polarization of a self-aligning magnet including another magnet design according to an embodiment of the present disclosure.
Figure 9C:
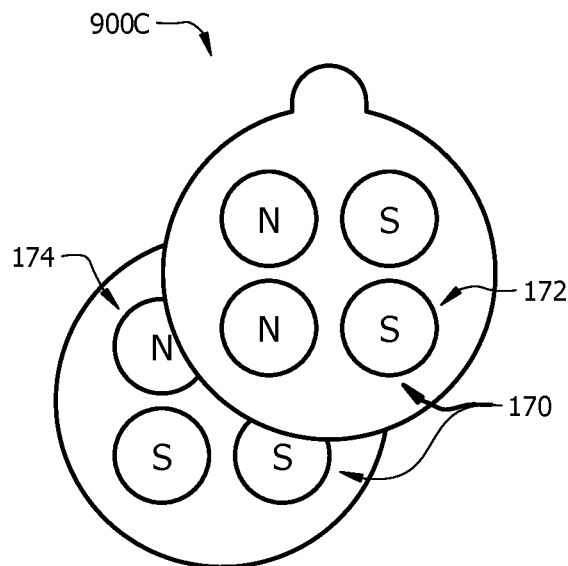
FIG. 9C depicts magnets of a pod accessory and a pod casing in a neutral position according to an embodiment of the present disclosure.
Figure 9D:
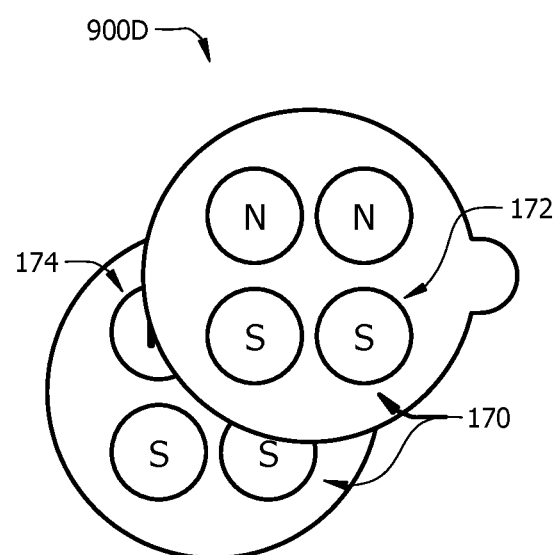
FIG. 9D depicts magnets of a pod accessory and a pod casing in an attracting position according to an embodiment of the present disclosure.

FIGS. 9A and 9B depict single magnets 900A, 900B, respectively, including magnet designs 910, 920, respectively, in which customized polarization of single magnets 900A and 900B may change shape according to embodiments of the present disclosure. It should be appreciated that the polarity within single magnets 900A and 900B may each have two poles. It should be appreciated that a plurality of magnets 170 (FIGS. 2, 4) may be self-aligning magnets 900A, 900B than may include magnet designs, 910, 920, and/or any other designs. It should further be appreciated that the plurality of magnets 170 may not include a design without departing from the present disclosure. It should also be appreciated that magnet designs 910, 920 may be a Polymagnet® design that may provide precision alignment in an embodiment of the present disclosure.

FIG. 9C depicts a configuration 900C of magnets 170 in a neutral or an open position in which magnets may not attract to one another according to an embodiment of the present disclosure. FIG. 9D depicts a configuration 900D of magnets 170 in an attracted or a closed position in which magnets may be attracted to one another according to an embodiment of the present disclosure. It should be appreciated that the plurality of magnets 170 may be located at a plurality of locations within a pod casing and/or a pod accessory. The selection of the number of magnets 170 may depend, at least, on the anticipated forces required to keep a pod casing secured to a pod accessory when external forces are sustained by the modular system (i.e. when the modular system falls onto a hard surface). It should be appreciated that modularity of the system to attach to different accessories and a power coupling.

between the modular system may improve runtime without making any accessory itself larger than conventional devices. It should also be appreciated that in lighting applications the modularity of the system may improve brightness levels without making any accessory itself larger than conventional devices. It should further be appreciated that a mechanical attachment of the modular system to an accessory may be accomplished by utilizing magnets. It should be appreciated that magnets may provide manipulation of poles or polarity and may provide a strong and self-aligning connection to components including other magnets. It should further be appreciated that the modular system may connect with an arm, clamp, or any other accessory that may extend the reach of modular system 100 without departing from the present disclosure.

Figure 10A:
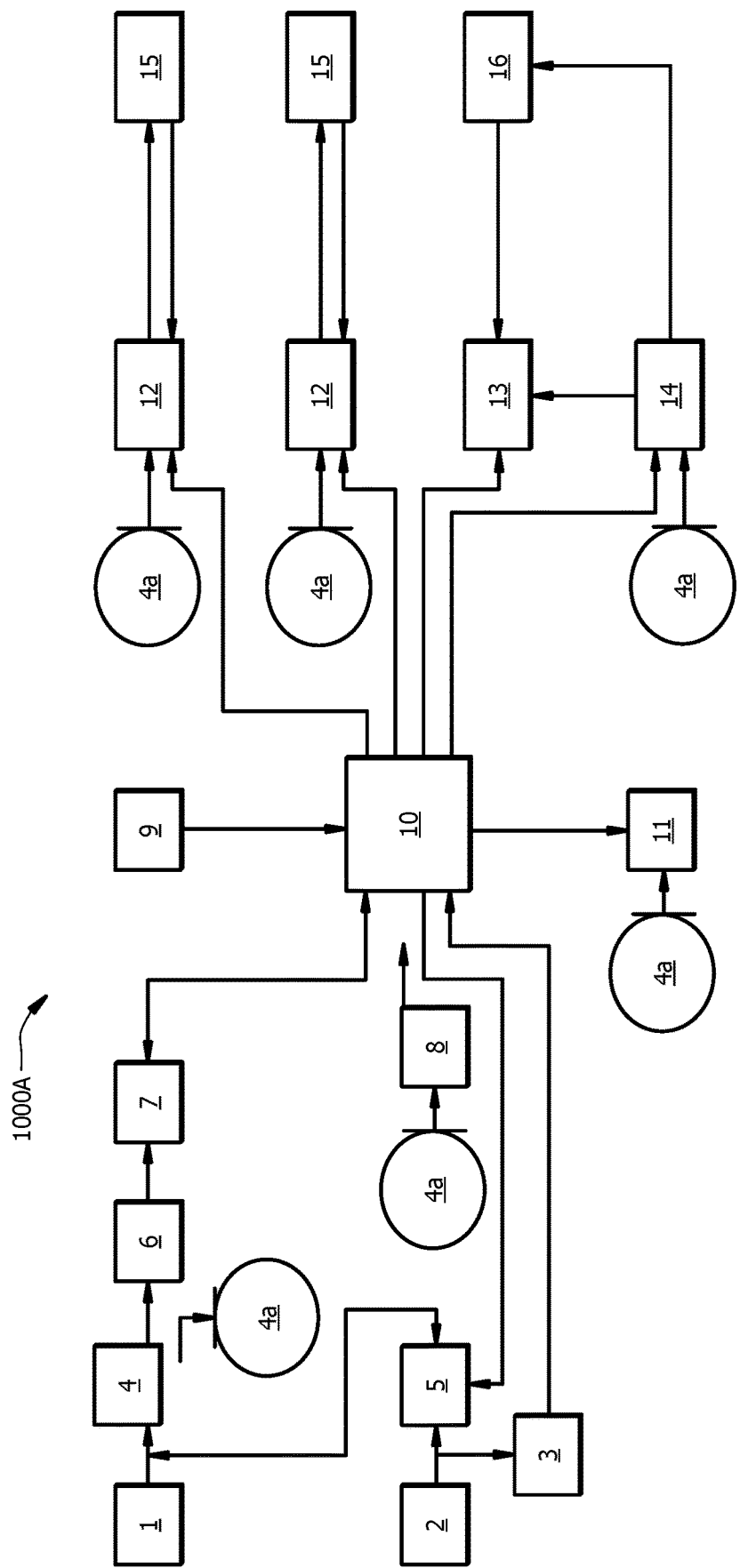
FIG. 10A depicts an electrical block diagram of a modular system according to an embodiment of the present disclosure.

FIG. 10A depicts electrical block diagram 1000A of a modular system according to an embodiment of the present disclosure. USB connector 1 may provide a power input that may charge at least one battery 6 and may provide power supplementation to at least one battery 6. It should be appreciated that USB connection 1 may be accessible when the modular system is not attached to an accessory. Power coupling 2 may provide power input from an accessory. Power coupling voltage conditioner 3 may create a reduced voltage compared to the voltage produced by power coupling 2 and may enable microcontroller unit (MCU) 10 to monitor the voltage. Battery charger or power manager 4 may control charging of at least one battery 6 and may control the maximum current that may be drawn from USB connector 1 and/or power coupling 2. Battery charger or power manager 4 may provide output power 4a to the modular system, such as a modular light system. Power coupling switch 5 may control whether or not power coupling 2 may be connected to an input of battery charger 4. Power coupling switch 5 may prevent voltages from being present on power coupling 2 if USB connector 1 is in-use. At least one battery 6 may be a lithium-ion battery pack that may include a protection circuit. Battery voltage conditioner 7 may create a reduced voltage compared to the voltage produced by at least one battery 6 and may enable MCU 10 to monitor the voltage. Logic power regulator 8 may provide stable logic voltage for MCU 10 and related functions and may enable MCU to monitor the voltage. Logic power regulator 8 may receive system power 4a. Buttons 9 may provide user-control capabilities for the modular system. MCU 10 may monitor and control the functions and features of modular system including, but not limited to, voltage and brightness. In some embodiments of the present disclosure, battery status LEDs 11 may provide user-facing LEDs that may communicate upon user request a remaining battery capacity and a status during charging. Battery status LEDs 11 may receive system power 4*a*. LED driver 12 may provide a high-powered driver for white LED 15 that may be monitored and controlled by MCU 10 and may receive system power 4*a*. LED driver 13 may provide a multi-channel power driver for red, green, and blue (RGB) LED module 16 that may provide lower power than LED driver 12. Boost converter 14 may generate a stable voltage that may be sufficiently high and may drive RGB LED module 16. Boost converter 14 may receive system power 4*a*.

Figure 10B:
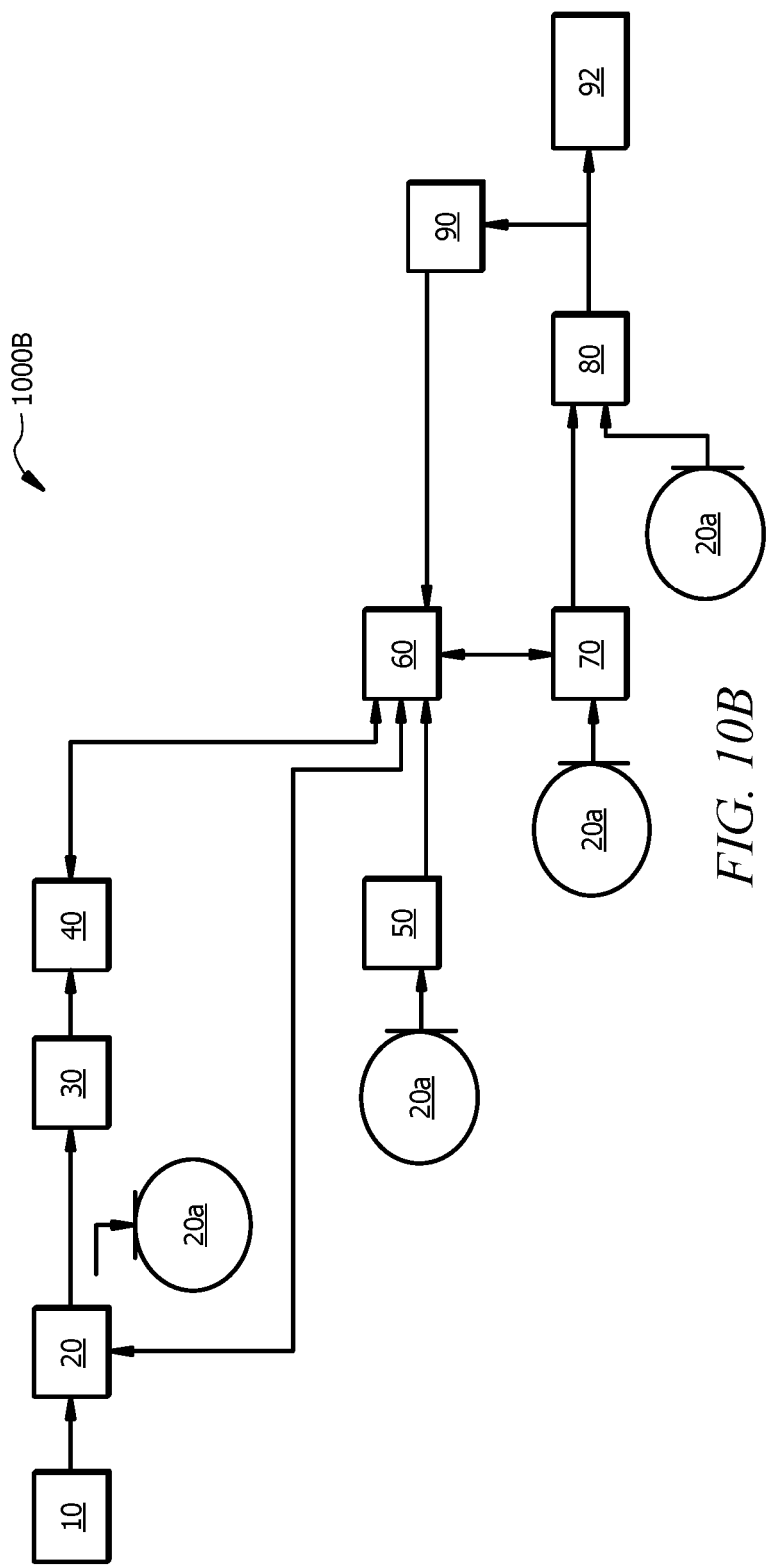
FIG. 10B depicts an electrical block diagram of an accessory component of a modular system according to an embodiment of the present disclosure.

FIG. 10B depicts electrical block diagram 1000B of an accessory according to an embodiment of the present disclosure. USB connector 10 may provide a power input that may charge at least one battery 30 and may provide power supplementation to at least one battery 30. Battery charger or power manager 20 may control charging of battery 30 and may control the maximum current that may be drawn from USB connector 10. Battery charger or power manager 20 may provide output power 40*a* to modular system. At least one battery 30 may be a lithium-ion battery pack that may include a protection circuit. Battery voltage conditioner 40 may create a reduced voltage compared to the voltage produced by at least one battery 30 and may enable MCU 60 to monitor the voltage. Logic power regulator 50 may provide stable logic voltage for MCU 60 and related functions and may enable MCU 60 to monitor the voltage. Logic power regulator 50 may receive system power 20*a*. MCU 60 may monitor and control the functions and features of a modular system including, but not limited to, voltage and brightness. Boost converter 70 may generate a stable voltage that may be sufficiently high and may receive system power 20*a*. It should be appreciated that boost converter 70 may provide a voltage that may be similar to a voltage of a standard USB VBUS voltage. Power coupling switch 80 may control whether or not power coupling 92 may be connected to boost converter 70 that may be under the control of MCU 60. Power coupling switch 80 may receive system power 20*a*. Power coupling voltage conditioner 90 may create a reduced voltage compared to the voltage produced by MCU 60 and may enable MCU 60 to monitor the voltage. Power coupling 92 may provide power output to the modular system.

Figure 11:
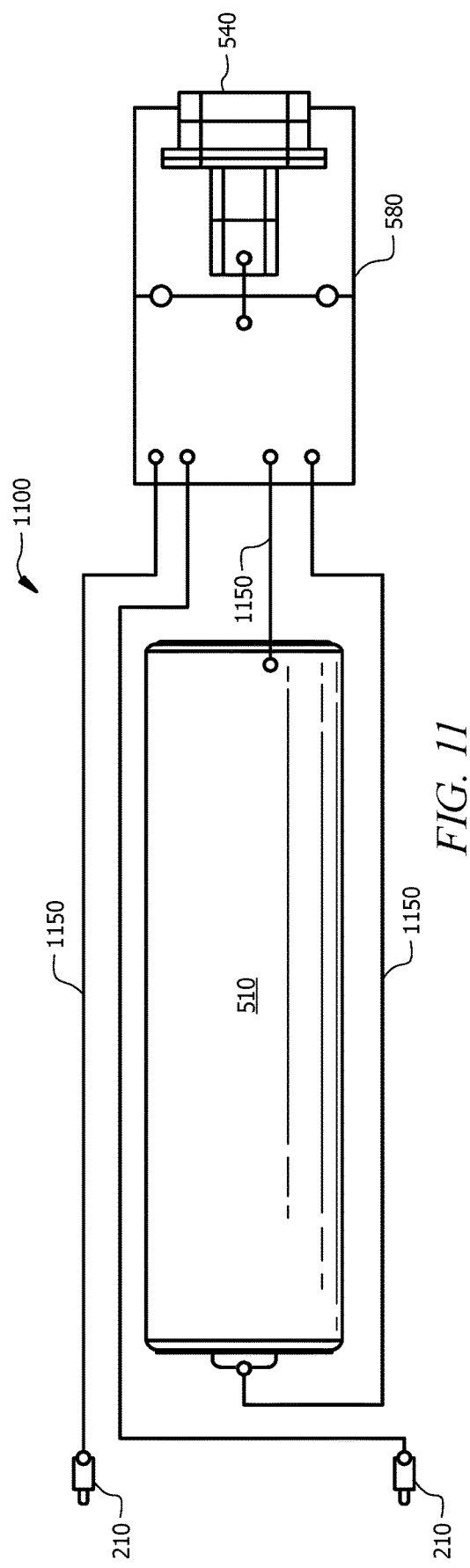
FIG. 11 depicts internal wiring of an accessory component according to an embodiment of the present disclosure.

FIG. 11 depicts internal wiring of an accessory including power coupling 1100 according to an embodiment of the present disclosure. A load resistance across contacts 210 of power coupling 1100 may connect to and disconnect from accessories. Contacts 210 may be utilized to request that power be supplied to accessories. Power may be supplied to accessories via circuitry 1150. Circuit board 580 may secure self-contained battery 510 inside an accessory and may provide electrical connection points for electrical equipment. Battery 510 may re-charge a pod casing and may provide additional current to a pod accessory that may increase performance and runtime. It should be appreciated that an increase in performance may include, but is not limited to, brightness, glare, intensity, and/or light output. USB port 540 may provide a power input that may charge battery 510 and may provide power supplementation to battery 510. It should be appreciated that an accessory component may be charged by an external power source and may not be charged by a pod casing. For example, a flashlight handle may be an accessory component that may be charged by an external power source that may be connected to the flashlight handle by a USB. It should be appreciated that the accessory component may not be charged by a pod casing, as electrical current may not flow from the pod casing to an accessory component in embodiments of the present disclosure. In other words, it should be appreciated that the power supply or electrical current may flow from a first component to a second component or vice versa.

It should be appreciated that the power coupling may provide a path for an accessory to provide power to a modular system. It should further be appreciated that an accessory may provide a full voltage and current to the modular system when attached to the power coupling that may operate and/or recharge batteries. It should also be appreciated that a power coupling may prevent a battery of an accessory from quickly losing power and may prevent damage to the modular system that may result from a short in an external object occurring across contacts of the power coupling. It should be appreciated that the power coupling may provide the advantage of maximizing accessory battery life by running a boost converter when needed. It should be appreciated that a boost converter may utilize a small amount of power even if it is not providing power.

FIG. 12 depicts operational process 1200 of a power coupling according to an embodiment of the present disclosure. A power coupling that may operate in three different states that may include sensing state 1210, power state 1220, and protective state 1230. Sensing state 1210 may provide a boost converter that may be turned off and an accessory battery voltage that may be provided to a power coupling via a series resistor. The power state may provide a boost converter that may enable and a series resistance of the sensing state that may be removed from the circuit. Protective state 1220 may provide a boost converter that may be turned off, and a power coupling that may be disconnected from the remaining circuits of the accessory. Operational process 1200 of a power coupling of a modular system may have a load resistance across the power coupling contacts that may connect and disconnect to accessories. Contacts may be utilized to request that power be supplied to accessories.

In sensing state 1210, the accessory may recognize the presence of a request resistance as a voltage within a specified range. It should be appreciated that a voltage divider may be formed by series resistance of the accessory and may request resistance of the modular system that may result in the request resistance being considered as a voltage. It should be appreciated that an MCU may be capable of sensing that the accessory is connected to the modular system and may be in sensing state 1210 or in power state 1220.

It should further be appreciated that the modular system may sense a state of charge of battery pack and may sense whether or not an LED is turned on. The modular system may utilize the state of charge and whether or not the LED is turned on to determine whether or not power should be requested from an accessory and may enable power to be fed through circuitry. It should be appreciated that feeding power through circuitry may enable the modular system to prevent damage from an out-of-specification voltage that may be provided at power coupling. It should further be appreciated that MCU may be in an accessory and may be capable of sensing voltage of power coupling. It should also be appreciated that an accessory may be aware of a state of charge of battery pack that may be used to determine a state in which modular system may be provided.

FIG. 12 depicts operational process 1200 of a power coupling that may be provided in sensing state 1210 and may remain in sensing state 1210 until voltage properties are checked by the user 1240 before continuing to power state 1220 according to an embodiment of the present disclosure. It should be appreciated that voltage properties may include, but are not limited to, change in voltage over time. It should further be appreciated that voltage may change when the modular system may request power. Power coupling may move to protective state 1230 when voltage does not decrease too low. It should be appreciated that voltage may be too low when the voltage is approximately zero.

A power coupling may be provided in protective state 1230 and may be able to draw a full current. A power coupling may return 1260 to sensing state 1210 after electrical properties are checked 1250. It should be appreciated that electrical properties may include, but are not limited to, current, voltage, and battery-life. The power coupling may be provided in protective state 1230 and may periodically return 1260 to sensing state 1210 to verify whether an undesirable condition is no longer present including, but not limited to, change in electrical properties.

It should be appreciated that an embodiment of the present disclosure may dramatically improve the brightness and runtime of portable devices. It should also be appreciated that modular systems may improve other properties when utilized in a number of industries including, but not limited to, construction, automotive, marine, military, emergency preparedness, safety, contracting, residential, outdoors, mining, tourism, maintenance, guiding, pet and animal industries, hunting, and fishing. It should further be appreciated that the device may be utilized with industry equipment including, but not limited to, automotive repair and emergency kits, home inspections, general contracting, pet and animal equipment, and architecture. It should be appreciated that the device may be utilized with items that may be found in a home including, but not limited to, a grill mount, photography equipment, a lawn mower mount, a stake mount, a night light and/or a plug of a light mount, a suction cup mount, a magnetic mount, a strap mount, an adjustable joint arm, a tow hitch mount, and a wall plug in a mount. It should be appreciated that the device may be utilized with items that may be in-motion including, but not limited to, a bike helmet mount, a drilled-plate mount, a clip or clamp mount, a clip or clamp mount that does not include an arm, a buoyant mount, a survival kit mount, a tree strap mount, an all-terrain vehicle (ATV) attachment, a kayak mount, and a boat rail mount.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A modular lighting system, comprising:
   a light casing including a protrusion arranged on an attachment face of the light casing;
   at least one detent provided on the protrusion;
   an accessory including an aperture configured to receive the protrusion, wherein the accessory is removable and interchangeable with one or more different accessories to convert the modular lighting system from a flashlight to another structure selected from the following: a bike light, a lantern, a head lamp, and an arm;
   at least one light-emitting diode (LED) enclosed inside the modular lighting system, wherein the light casing is operable without being connected to the accessory; and
   at least one first attachment mechanism arranged in the light casing and at least one second attachment mechanism arranged in the accessory, the at least one first attachment mechanism configured to align with the at least one second attachment mechanism and secure the light casing against the accessory, wherein the modular lighting system operates without being attached to the accessory.

2. The modular lighting system of claim 1, wherein the at least one first attachment mechanism is at least one first magnet, and wherein the at least one second attachment mechanism is at least one second magnet.

3. The modular lighting system of claim 1, wherein the light casing is attachable and detachable from the accessory.

4. The modular lighting system of claim 1, further comprising:
   at least one button provided in the light casing to control brightness, intensity, light color, strobe lighting, and additional modes of the modular lighting system.

* * * * *